United States Patent
Kato et al.

(10) Patent No.: US 9,391,449 B2
(45) Date of Patent: Jul. 12, 2016

(54) SEMICONDUCTOR DEVICE

(71) Applicant: Semiconductor Energy Laboratory Co., Ltd., Kanagawa-ken (JP)

(72) Inventors: Kiyoshi Kato, Kanagawa (JP); Asami Tadokoro, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 14/642,002

(22) Filed: Mar. 9, 2015

(65) Prior Publication Data

US 2015/0188311 A1    Jul. 2, 2015

Related U.S. Application Data

(63) Continuation of application No. 13/047,004, filed on Mar. 14, 2011, now Pat. No. 8,977,203, which is a continuation of application No. 11/870,824, filed on Oct. 11, 2007, now Pat. No. 7,907,902.

(30) Foreign Application Priority Data

Oct. 18, 2006   (JP) ................................ 2006-283935

(51) Int. Cl.
*H04B 7/00*       (2006.01)
*H02H 9/02*       (2006.01)
(Continued)

(52) U.S. Cl.
CPC ............. *H02H 9/02* (2013.01); *G06K 19/0701* (2013.01); *G06K 19/0715* (2013.01); *G06K 19/0723* (2013.01); *H01Q 1/2208* (2013.01); *H01Q 1/2283* (2013.01); *Y10T 307/858* (2015.04)

(58) Field of Classification Search
CPC .................................................. G06K 19/0715
USPC .................... 455/41.2, 41.1, 41.3, 343.1, 572
See application file for complete search history.

(56) References Cited

U.S. PATENT DOCUMENTS

| | | | |
|---|---|---|---|
| 3,898,522 A | 8/1975 | Klein et al. | |
| 4,717,996 A * | 1/1988 | Bourke | H02H 7/1206 323/223 |
| 5,638,246 A * | 6/1997 | Sakamoto | H02H 5/044 361/103 |

(Continued)

FOREIGN PATENT DOCUMENTS

| | | |
|---|---|---|
| EP | 0 829 940 A2 | 3/1998 |
| EP | 1 703 559 A1 | 9/2006 |

(Continued)

OTHER PUBLICATIONS

European Search Report re Application No. EP 07019286.9, dated Jan. 14, 2009.

(Continued)

*Primary Examiner* — Sanh Phu
(74) *Attorney, Agent, or Firm* — Husch Blackwell LLP

(57) ABSTRACT

Of a wireless communication system, an RF tag which can operate normally even when a communication distance is extremely short, like the case where the RF tag is in contact with a reader/writer, whereby the reliability is improved. The RF tag which communicates data by wireless communication includes a comparison circuit which compares electric power supplied from outside with reference electric power and a protection circuit portion which is operated when the electric power supplied from outside is higher than the reference electric power in the comparison circuit.

15 Claims, 19 Drawing Sheets

(51) Int. Cl.
*G06K 19/07* (2006.01)
*H01Q 1/22* (2006.01)

(56) References Cited

U.S. PATENT DOCUMENTS

| | | | |
|---|---|---|---|
| 5,736,728 | A | 4/1998 | Matsubara |
| 6,069,782 | A | 5/2000 | Lien et al. |
| 6,097,292 | A | 8/2000 | Kelly et al. |
| 6,198,646 | B1 * | 3/2001 | Barrett .................. H03K 3/55 363/96 |
| 6,321,067 | B1 | 11/2001 | Suga et al. |
| 6,427,065 | B1 | 7/2002 | Suga et al. |
| 6,799,015 | B1 | 9/2004 | Tiwari |
| 6,879,809 | B1 | 4/2005 | Vega et al. |
| 7,102,862 | B1 | 9/2006 | Lien et al. |
| 7,215,248 | B2 | 5/2007 | Heinrich et al. |
| 7,471,188 | B2 | 12/2008 | Koyama et al. |
| 7,605,056 | B2 | 10/2009 | Takahashi et al. |
| 7,703,677 | B2 | 4/2010 | Alihodzic |
| 7,907,902 | B2 * | 3/2011 | Kato ................ G06K 19/0701 235/451 |
| 8,160,636 | B2 | 4/2012 | Tadokoro |
| 8,233,252 | B2 | 7/2012 | Grombach et al. |
| 8,351,226 | B2 | 1/2013 | Osada |
| 8,358,202 | B2 * | 1/2013 | Takahashi ............ H04B 5/0037 329/349 |
| 8,977,203 | B2 * | 3/2015 | Kato ................ G06K 19/0701 235/451 |
| 2002/0167770 | A1 * | 11/2002 | Kato .................... H02J 7/0029 361/58 |
| 2003/0107424 | A1 * | 6/2003 | Huang ............ H03K 17/08122 327/310 |
| 2005/0057866 | A1 | 3/2005 | Mergens et al. |
| 2005/0122651 | A1 | 6/2005 | Fischer et al. |
| 2005/0161508 | A1 | 7/2005 | Akaida et al. |
| 2005/0280509 | A1 | 12/2005 | Tanaka et al. |
| 2005/0282505 | A1 | 12/2005 | Umeda et al. |
| 2006/0116968 | A1 | 6/2006 | Arisawa |
| 2006/0128345 | A1 | 6/2006 | Ootaka et al. |
| 2006/0133545 | A1 | 6/2006 | Kunc et al. |
| 2006/0164215 | A1 | 7/2006 | Kofler |
| 2008/0094027 | A1 | 4/2008 | Cho |
| 2008/0158926 | A1 | 7/2008 | Umeda et al. |
| 2008/0252458 | A1 | 10/2008 | Chen et al. |
| 2008/0311850 | A1 | 12/2008 | Ootaka et al. |
| 2008/0318523 | A1 | 12/2008 | Umeda et al. |

FOREIGN PATENT DOCUMENTS

| | | |
|---|---|---|
| GB | 2 307 364 A | 5/1997 |
| JP | 09-148869 A | 6/1997 |
| JP | 10-145987 A | 5/1998 |
| JP | 10-307898 A | 11/1998 |
| JP | 2002-176141 A | 6/2002 |
| JP | 2002-368647 A | 12/2002 |
| JP | 2003-085506 A | 3/2003 |
| JP | 2005-202721 A | 7/2005 |
| JP | 2005-204493 A | 7/2005 |
| JP | 2006-005651 A | 1/2006 |
| JP | 2006-261679 A | 9/2006 |
| TW | M319464 | 9/2007 |
| WO | WO 2006/101285 A1 | 9/2006 |

OTHER PUBLICATIONS

European Search Report re Application No. EP 07019286.9, dated Mar. 13, 2009.

* cited by examiner

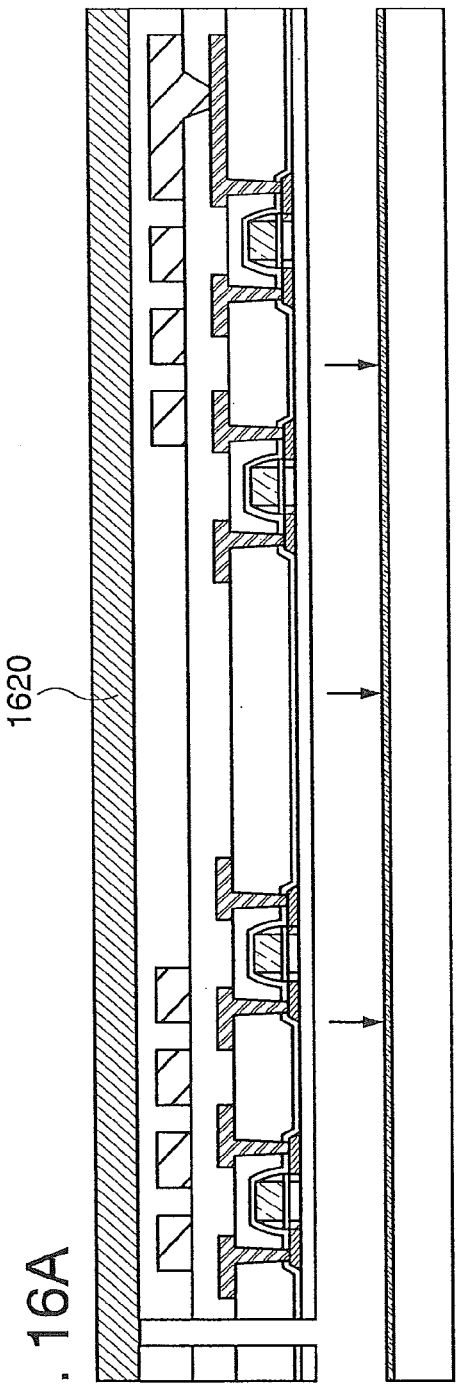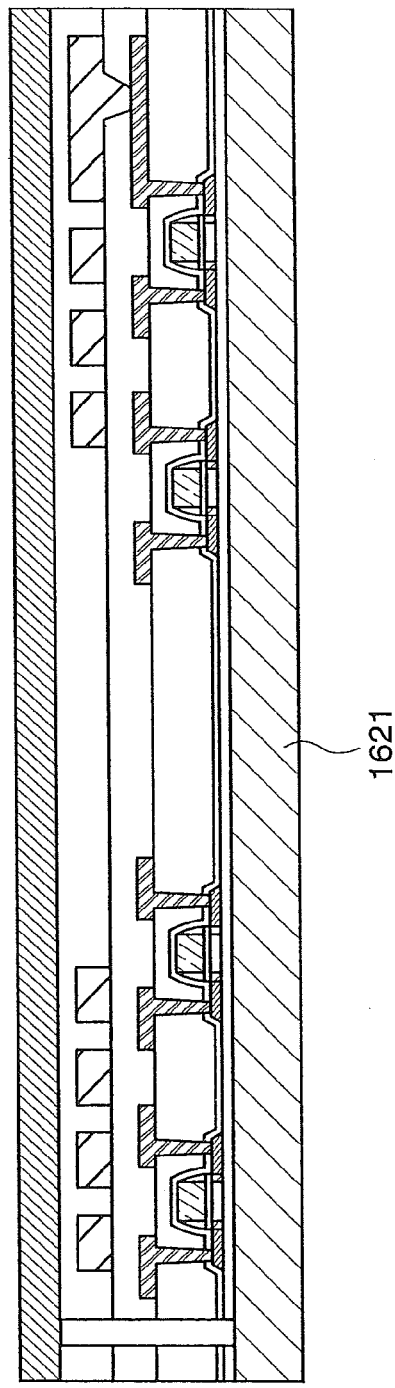
FIG. 16A
FIG. 16B

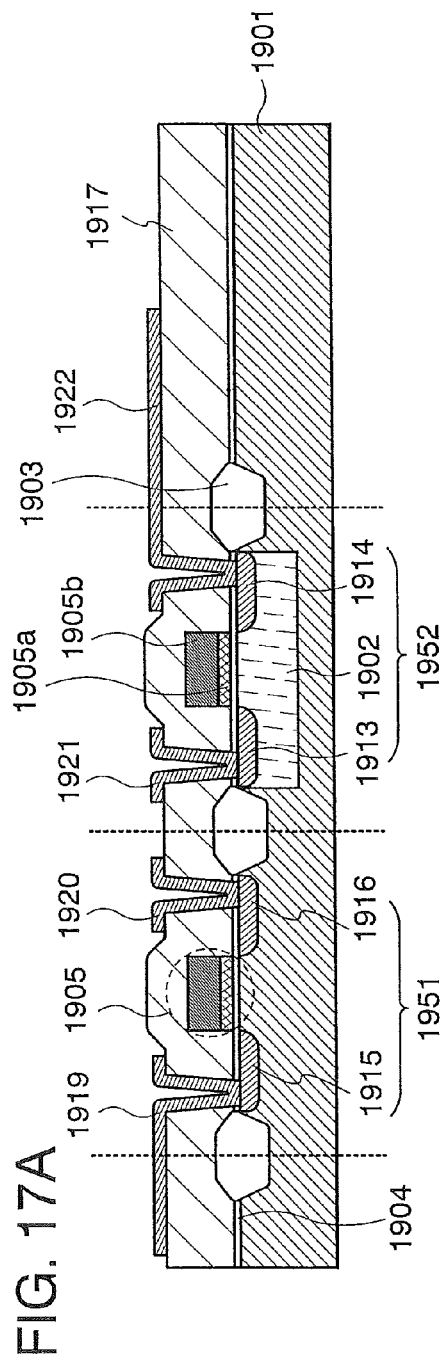
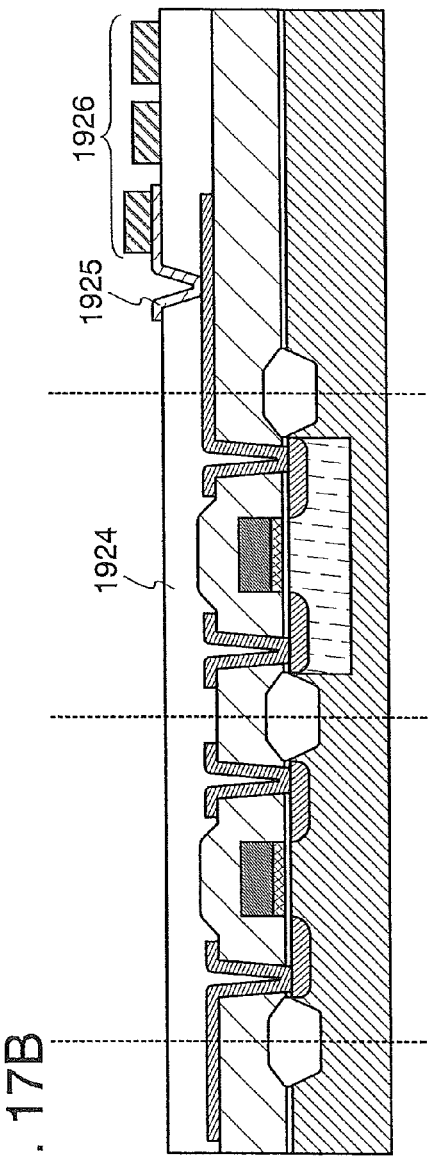
FIG. 17A
FIG. 17B

SEMICONDUCTOR DEVICE

This application is a continuation of copending U.S. application Ser. No. 13/047,004 filed on Mar. 14, 2011 which is a continuation of U.S. application Ser. No. 11/870,824 filed on Oct. 11, 2007 (now U.S. Pat. No. 7,907,902 issued Mar. 15, 2011), which are all incorporated herein by reference.

BACKGROUND OF THE INVENTION

1. Field of the Invention

The present invention relates to an RF tag which performs data communication (reception and transmission) by wireless communication. The present invention relates to, in particular, an RF tag including a protection circuit which prevents element deterioration or destruction of a chip itself of the RF tag when a large amount of electric power is received by wireless communication.

2. Description of the Related Art

Nowadays, an individual identification technology using wireless communication (hereinafter referred to as a wireless communication system) has attracted attention. In particular, as a data carrier which communicates data by wireless communication, an individual identification technology with an RF tag (hereinafter, an RF tag referred in this specification is regardless of its shape such as a card shape or a chip shape) utilizing an RFID (Radio Frequency Identification) technology has attracted attention. The RF tag is also called an IC (Integrated Circuit) tag, an IC chip, an RFID tag, a wireless tag, or an electronic tag. The individual identification technology using a wireless chip has started to be used for production of an individual object, management, or the like thereof and has been developed to be applied to personal authentication.

A wireless communication system herein is a communication system which wirelessly exchanges data between a power supply source and transceiver such as a reader/writer and a transceiver such as an RF tag.

The wireless communication system does not need a physical connection between the reader/writer and the RF tag. That is, as log as the RF tag exists in a region specified by the reader/writer, data can be exchanged with the RF tag by communication between the reader/writer and the RF tag.

As for the reader/writer and RF tag, in order to extend the communication distance therebetween, research and development for increasing the power supply efficiency from the reader/writer to the RF tag has been activated (e.g., reference 1: Japanese Published Patent Application No. 2006-5651).

SUMMARY OF THE INVENTION

On the other hand, in the wireless communication system, when data in a plurality of RF tags is read by a reader/writer at the same time, the distance between the reader/writer and each RF tag (hereinafter referred to as a communication distance) is not the same. Further, the communication distance may vary from hour to hour, like the case where a carton of products provided with an RF tag is passed through a reader/writer by using a forklift truck.

In general, electric power is attenuated in proportion to the squared distance between a radiant point of electric power and a measurement point of the electric power. That is, depending on the communication distance, electric power supplied from the reader/writer to the RF tag varies.

Therefore, particularly when the communication distance is extremely short, such as the case where the reader/writer and the RF tag are in contact with each other, a large amount of electric power is supplied to the RF tag. When a large amount of electric power is supplied to the RF tag, the RF tag cannot correctly demodulate a signal from the reader/writer and malfunctions, so that an internal element of the RF tag is deteriorated. In the worst case, the RF tag itself could be destroyed.

The present invention is made in view of the foregoing problems, and an object of the present invention is to provide an RF tag which operates normally even when the communication distance is extremely short and has high reliability.

The present invention is made in view of the foregoing problems. The present invention is an RF tag which communicates data by wireless communication, in which a comparison circuit which compares electric power supplied from outside with reference electric power and a protection circuit portion which operates when the electric power supplied from outside is higher than the reference electric power in the comparison circuit are included.

According to one aspect of the RF tag of the present invention, a comparison circuit which compares electric power supplied from outside with reference electric power and a protection circuit portion which operates when the electric power supplied from outside is higher than the reference electric power in the comparison circuit are included.

According to another aspect of the RF tag of the present invention, a comparison circuit which compares electric power supplied from outside to a power source circuit portion which supplies electric power to a logic circuit portion which processes data with reference electric power and a protection circuit portion which operates when the electric power supplied from outside is higher than the reference electric power in the comparison circuit are included.

According to another aspect of the RF tag of the present invention, a comparison circuit which compares electric power supplied from outside with reference electric power and a protection circuit portion which includes a switch and a load are included, and the protection circuit portion is operated by turning on the switch when the electric power supplied from outside is higher than the reference electric power in the comparison circuit.

According to another aspect of the RF tag of the present invention, a comparison circuit which compares electric power supplied from outside to a power source circuit portion which supplies electric power to a logic circuit portion which processes data with reference electric power and a protection circuit portion which includes a switch and a load are included, and the protection circuit portion is operated by turning on the switch when the electric power supplied from outside is higher than the reference electric power in the comparison circuit.

Note that in the RF tag according to the present invention, an antenna may be included and the electric power supplied from outside may be supplied from the antenna.

Note that in the RF tag according to the present invention, an antenna, an input circuit portion, and a logic circuit portion may be included and the comparison circuit and the protection circuit portion may be provided in the input circuit portion.

Note that in the RF tag according to the present invention, a battery may be included, and a charging comparison circuit which compares electric power supplied from outside in order to charge the battery with reference electric power and, a charging protection circuit portion which operates when the electric power supplied from outside is higher than the reference electric power in the charging comparison circuit may be included.

Note that in the RF tag according to the present invention, a battery may be included, a charging comparison circuit which compares electric power supplied from outside in order to charge the battery and reference electric power and a charging protection circuit portion which includes a switch and a load may be included, and the charging protection circuit portion may be operated by turning on the switch in the charging protection circuit portion when the electric power supplied from outside is higher than the reference electric power in the charging comparison circuit.

Note that being "connected" in this specification means being "electrically connected".

By using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

BRIEF DESCRIPTION OF THE DRAWINGS

FIGS. 16A and 16B are diagrams for describing Embodiment 8 of the present invention.

FIGS. 17A and 17B are diagrams for describing Embodiment 9 of the present invention.

DETAILED DESCRIPTION OF THE INVENTION

Figure 1:
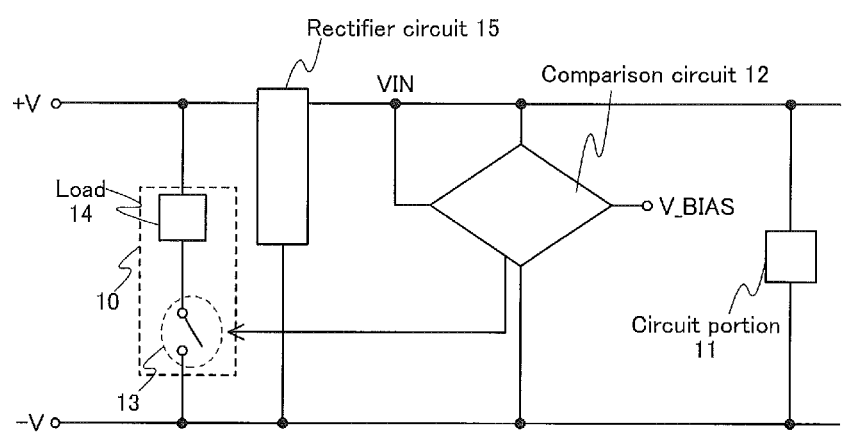
FIG. 1 is a block diagram showing one structure example of Embodiment Mode 1 of the present invention.

Although the present invention will be fully described by way of an embodiment mode and embodiments with reference to the accompanying drawings, it is to be understood that various changes and modifications will be apparent to those skilled in the art. Therefore, unless such changes and modifications depart from the scope of the present invention, they should be construed as being included therein. Through all the drawings for describing the embodiment mode and embodiments, the same portions and portions having similar functions are denoted by the same reference numerals, and description thereof is not repeated.

(Embodiment Mode 1)

Embodiment Mode 1 of the present invention is described with reference to FIG. 1.

An RF tag of the present invention includes a circuit portion 11, a rectifier circuit 15, a comparison circuit 12 which is a means for comparing an input voltage VIN with a reference voltage V_BIAS, and a protection circuit portion 10 as shown in FIG. 1. The protection circuit portion 10 includes a switch 13 which is turned on or off depending on a result of comparison between the input voltage VIN and the reference voltage V_BIAS, and a load 14.

In the protection circuit portion 10 shown in FIG. 1, the load 14 which changes input impedance is provided between the switch 13 and a +V terminal. Note that in the protection circuit portion 10, the load 14 may be provided between the switch 13 and a −V terminal. Further, in the protection circuit portion 10, when a load of the switch 13 itself can be used, the load 14 is not necessarily provided.

The comparison circuit 12 shown in FIG. 1 compares potentials of the input voltage VIN and the reference voltage V_BIAS, and keeps the switch 13 off when the voltage inputted from the +V terminal is lower than the V_BIAS and turns the switch 13 on when the voltage inputted from the +V terminal is higher than the V_BIAS.

That is, in the case where the impedance except the impedance of the protection circuit portion 10 shown in FIG. 1 is $Z_1$, when the switch 13 is on, the impedance of the protection circuit portion 10 is $Z_2$ and the input impedance is expressed by a parallel connection of $Z_1$ and $Z_2$, that is $(1/Z_1+1/Z_2)^{-1}$. On the other hand, when the switch 13 in the protection circuit portion 10 is off, the impedance $Z_2$ of the protection circuit portion 10 is real infinite, and the input impedance is $Z_1$.

Note that it is not necessary that the input voltage VIN and the reference voltage V_BIAS are directly compared with each other. Specific description thereof is made with reference to FIGS. 11A and 11B.

Figure 11A:
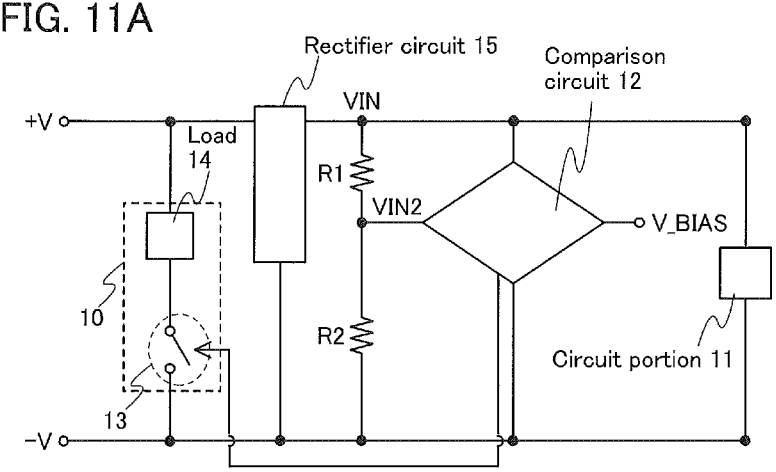
FIGS. 11A and 11B are block diagrams each showing one structure example of Embodiment Mode 1 of the present invention.

As shown in FIG. 11A, in the case where the input voltage VIN is extremely high, resistors R1 and R2 are connected in series between the +V terminal and the −V terminal and the potential at a connection point of the resistor R1 and the resistor R2 is used as an input voltage VIN2. A method in which the input voltage VIN2 and the reference voltage V_BIAS are compared with each other in the comparison circuit 12.

Figure 11B:
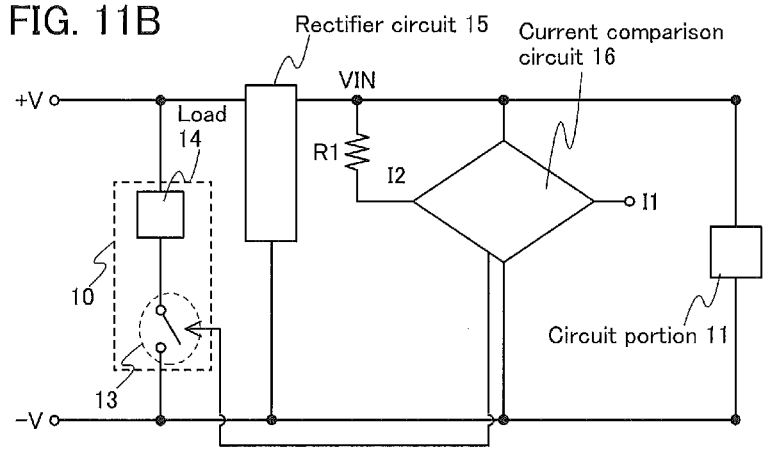

Alternatively, for example, as shown in FIG. 11B, by providing a resistor R1 between the input voltage VIN and the comparison circuit 12, a current $I_2$ can be detected and the detected current $I_2$ and a reference current $I_1$ can be compared with each other in a current comparison circuit 16.

For example, in an RF tag including an antenna and an IC chip, an internal circuit is operated by using electric power received by the antenna.

In FIG. 1, the terminal denoted by +V is connected to a + terminal of the antenna and the terminal denoted by −V is connected to a − terminal of the antenna. The electric power received by the antenna is transmitted to inside a chip itself, and the internal circuit is operated. At this time, when the distance between the reader/writer and the RF tag (hereinafter referred to as a communication distance) is extremely short and the amount of electric power received by the antenna is too large, that is, when the input voltage VIN is extremely high, the switch 13 is turned on and the impedance of the protection circuit portion 10 becomes $Z_2$. At this time, the input impedance of the chip itself is expressed by a parallel connection of $Z_1$ and $Z_2$, that is $(1/Z_1+1/Z_2)^{-1}$. By employing the structure shown in FIG. 1, impedance matching between the antenna and the chip itself can be deviated, and a large amount of electric power which may be received by the antenna can be prevented from being transmitted to inside the RF tag so much. Therefore, without deteriorating an internal element of the RF tag or destroying the RF tag itself, the RF tag can be operated normally.

By using the present invention, impedance matching between an antenna and a chip itself included in an RF tag is deviated intentionally when a large amount of electric power is supplied to the RF tag, and the large amount of electric power which may be received by the antenna cannot be transmitted to inside the RF tag so much. Therefore, without deteriorating an internal element of an RF tag or destroying an RF tag itself, the RF tag can be operated normally.

(Embodiment 1)

Figure 2:
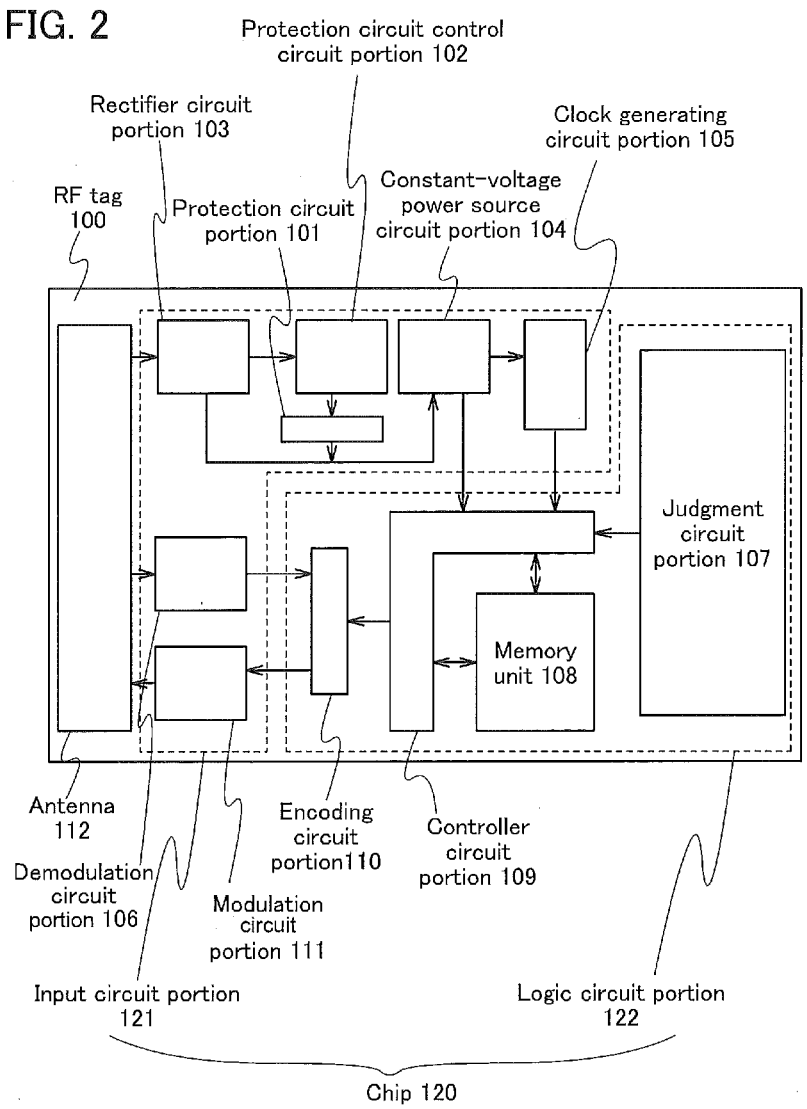
FIG. 2 is a block diagram showing Embodiment 1 of the present invention.

Embodiment 1 is described with reference to FIG. 2.

An RF tag 100 of the present invention includes an antenna 112 to receive electric power and data from a reader/writer and a chip itself 120 including an input circuit portion 121 and a logic circuit portion 122. Note that the antenna 112 can be manufactured separately from the chip itself 120 and then connected thereto to form the RF tag. Preferably, the antenna 112 and the chip itself 120 are formed by the same process.

The input circuit portion 121 of the RF tag 100 includes a rectifier circuit portion 103 to convert electric power received by the antenna 112 from alternating current into direct current, a constant-voltage power source circuit portion 104 to supply a constant voltage to an internal circuit, a protection circuit portion 101 (also called a limiter circuit) to protect the internal circuit when the amount of electric power received by the antenna 112 is too large, a protection circuit control circuit portion 102 to control whether or not to operate the protection circuit portion 101, a clock generating circuit portion 105 to generate a clock signal supplied to the internal circuit, a demodulation circuit portion 106 to demodulate data received from the antenna 112 to a digital signal, and a modulation circuit portion 111 to modulate encoded data. Note that the protection circuit control circuit portion 102 in FIG. 3 corresponds to the comparison circuit 12 in FIG. 1.

The logic circuit portion 122 of the RF tag 100 includes an instruction analysis portion to analyze data demodulated in the demodulation circuit portion 106, a judgment circuit portion 107 to judge whether demodulated data is received normally or not, a memory unit 108 (hereinafter referred to as a memory), a controller circuit portion 109 to control the memory, and an encoding circuit portion 110 to encode data.

A structure of the input circuit portion according to Embodiment 1 of the present invention is described in detail with reference to FIG. 3.

Figure 3:
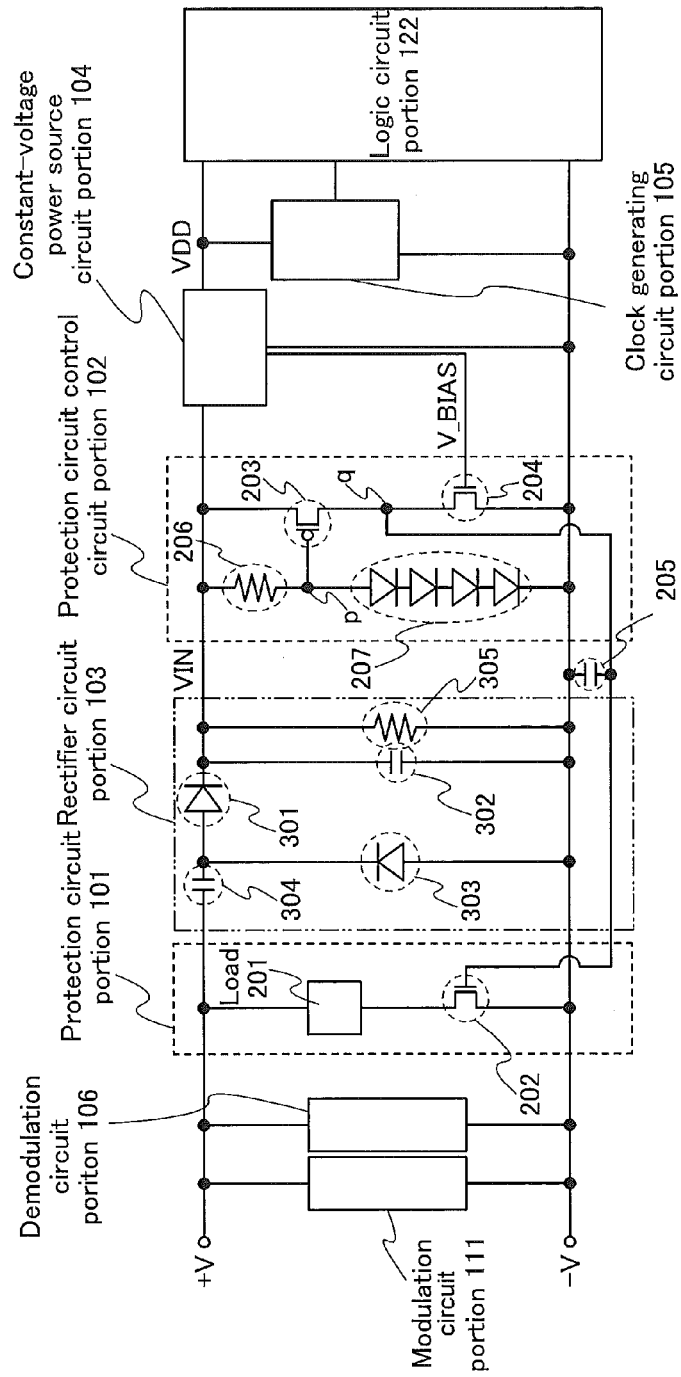
FIG. 3 is a diagram showing one structure example of an input circuit portion according to Embodiment 1 of the present invention.

In FIG. 3, a terminal denoted by +V is connected to a + terminal of the antenna 112 and a terminal denoted by −V is connected to a − terminal of the antenna 112. A signal encoded in the encoding circuit portion 110 is inputted into the modulation circuit portion 111 and load modulation is performed therein. The demodulation circuit portion 106 demodulates an electric wave inputted from the +V terminal and outputs a signal after being demodulated. The signal after being demodulated is inputted into the encoding circuit portion in the logic circuit portion 122. A voltage VIN which is rectified in the rectifier circuit portion 103 and a voltage of the −V terminal are inputted to the constant-voltage power source circuit portion 104, and the constant-voltage power source circuit portion 104 outputs a power source voltage VDD which is made constant and the reference voltage V_BIAS. A VDD terminal is connected to the clock generating circuit portion 105 and the logic circuit portion 122, and supplies electric power to each circuit. A V_BIAS terminal is connected to the protection circuit control circuit portion 102 so that a reference voltage for determining a potential of a node q is made. The power source voltage VDD and a voltage of the −V terminal are inputted to the clock generating circuit portion 105 and the clock generating circuit portion 105 outputs a reference clock signal. An output terminal of the clock generating circuit portion 105 is connected to the logic circuit portion 122 so that a clock signal is supplied to each circuit in the logic circuit portion 122.

The rectifier circuit portion 103 includes a diode 301 to convert (rectify) an alternating-current power source voltage inputted from the +V terminal to a direct-current power source voltage and charge a capacitor 302, a diode 303 to convert (rectify) an alternating-current power source voltage inputted from the −V terminal to a direct-current power source voltage and charge a capacitor 304, the capacitor 302 to store the direct-current power source voltage rectified in the diode 301, and the capacitor 304 to detect an electric wave inputted from the +V terminal and store the charge rectified in the diode 303. Note that the RF tag is preferably provided with a resistor 305 to discharge a charge accumulated in the chip itself 120 at the time of reset (nonoperating state).

An output terminal of the diode 301 is connected to the capacitor 302, and an input terminal thereof is connected to the capacitor 304. One terminal of the capacitor 302 is connected to the diode 301 and the other terminal thereof is connected to the −V terminal. An output terminal of the diode 303 is connected to the capacitor 304, and an input terminal thereof is connected to the −V terminal. One terminal of the capacitor 304 is connected to the +V terminal and the other terminal thereof is connected to the diode 303. In this specification, an output terminal of the rectifier circuit portion 103 is referred to as a VIN terminal.

Further, in the RF tag, when the resistor 305 to discharge a charge accumulated in the chip itself 120 at the time of reset (nonoperating state) is provided, one terminal of the resistor 305 is connected to the VIN terminal and the other terminal thereof is connected to the −V terminal.

Further, although the case where a circuit structure called a half-wave voltage-doubler rectifier circuit is used for the rectifier circuit portion 103 is described in this embodiment, the present invention is not limited thereto and any of a half-wave voltage-quadrupler rectifier circuit, a half-wave voltage-sextuplicater rectifier circuit, a full-wave rectifier circuit, and the like may also be used.

The protection circuit portion 101 and the protection circuit control circuit portion 102 shown in FIG. 3 are described in detail below.

The protection circuit control circuit portion 102 includes a transistor 204 which is driven by the reference voltage (V_BIAS) generated in the constant-voltage power source circuit portion 104, a phase compensation capacitor 205, a diode 207 to determine a potential of a node p, a resistor 206, and a transistor 203 to receive a change of the potential of the node p and change the potential of the node q.

The protection circuit portion 101 includes a transistor 202 to determine whether or not to supply current to a load 201 and the load 201 through which current flows when the transistor 202 is turned on to change an input impedance of the chip itself 120.

The load 201 controls the amount of change of the input impedance of the chip itself 120 depending on an output of the protection circuit control circuit portion 102 (the potential of the node q). For example, the load 201 is formed of a capacitor, a resistor, an inductor, or the like.

One terminal of the resistor 206 is connected to the VIN terminal and the other terminal thereof is connected to the diode 207 in series. One terminal of the diode 207 is connected to the resistor 206 and the other terminal thereof is connected to the −V terminal. In FIG. 3, a connection point between the resistor 206 and the diode 207 is referred to as a node p. A gate electrode of the transistor 203 is connected to the node p, a source electrode thereof is connected to the +V terminal, and a drain electrode thereof is connected to the transistor 204. A gate electrode of the transistor 204 is connected to a reference voltage (V_BIAS) output terminal of the constant-voltage power source circuit portion 104, a source electrode thereof is connected to the −V terminal, and a drain electrode thereof is connected to the transistor 203. In FIG. 3, a connection point between the transistor 204 and the transistor 203 is referred to as a node q. The capacitor 205 is connected between a source terminal and a drain terminal of the transistor 204. Further, a drain electrode of the transistor 204 is connected to a gate electrode of the transistor 202. The gate electrode of the transistor 202 is connected to the drain electrode of the transistor 204, a source electrode thereof is connected to the −V terminal, and a drain electrode thereof is connected to the load 201. One terminal of the load 201 is connected to the drain electrode of the transistor 202 and the other terminal thereof is connected to the +V terminal.

In FIG. 3, an example where four diodes 207 are connected in series is described; however, the number of diodes is not limited to this as long as the potential of the node p can be kept to the potential which does not turn on the transistor 203 at the time of normal driving (when the protection circuit portion 101 is not operated).

Note that as each of the diodes 207, 301, and 303, a diode element is not necessarily used, a MOS transistor with gate and drain electrodes electrically connected to each other may be used.

In FIG. 3, when the communication distance is appropriate and the RF tag operates normally, the voltage (V_BIAS) applied to the gate electrode of the transistor 204 is constant due to the function of the constant-voltage power source circuit portion 104, so that the transistor 204 functions as a constant current source.

Further, when the potential of the node p is lower than the threshold voltage of the diode 207, the transistor 203 is turned off and the potential of the node q is kept to the potential which is higher than the potential of the −V terminal by the threshold voltage of the transistor 204.

The drain electrode of the transistor 204 is connected to the gate electrode of the transistor 202 and the transistor 202 is turned off. Therefore, little current flows into the load 201 and the input impedance of the chip itself 120 does not change. The RF tag 100, therefore, operates normally.

When the communication distance is extremely short and a large amount of electric power is supplied to the RF tag, the potential of the node p becomes higher than the threshold voltage of the diode 207 and current flows into the diode 207, so that the potential of the node p is decreased. In accordance with this, the transistor 203 is turned on.

When the transistor 203 is turned on and current flows into the node q, the potential of the node q is increased. When the potential of the node q becomes higher than the threshold voltage of the transistor 202, the transistor 202 is turned on and current flows into the load 201.

When current flows into the load 201, the impedance of the chip itself 120 is changed.

To change the input impedance of the chip itself 120 means that the impedance matching between the antenna 112 and the chip itself 120 is deviated. In other words, the reflection coefficient is increased.

In general, electric-power reflection occurs when matching between output impedance on the side of supplying electric power and input impedance on the side of receiving electric power is deviated, and the transmission efficiency of electric power is decreased. That is, in order to efficiently transmit electric power received by the antenna 112 to the chip itself 120, matching impedance between the antenna 112 and the chip itself 120 is required.

The above-described property is used in this embodiment, too. When the communication distance is extremely short and a large amount of electric power is supplied to the RF tag, current is supplied to the load 201 to change the impedance of the chip itself 120, so that the impedance matching between the chip itself 120 and the antenna 112 is deviated intentionally. Accordingly, a large amount of electric power which may be received by the antenna 112 is not transmitted to the chip itself 120 so much, and therefore, the RF tag can be operated without deteriorating an internal element of the RF tag or destroying the RF tag itself.

Input-impedance measurement results of the RF tag described in this embodiment are described below.

Figure 9:
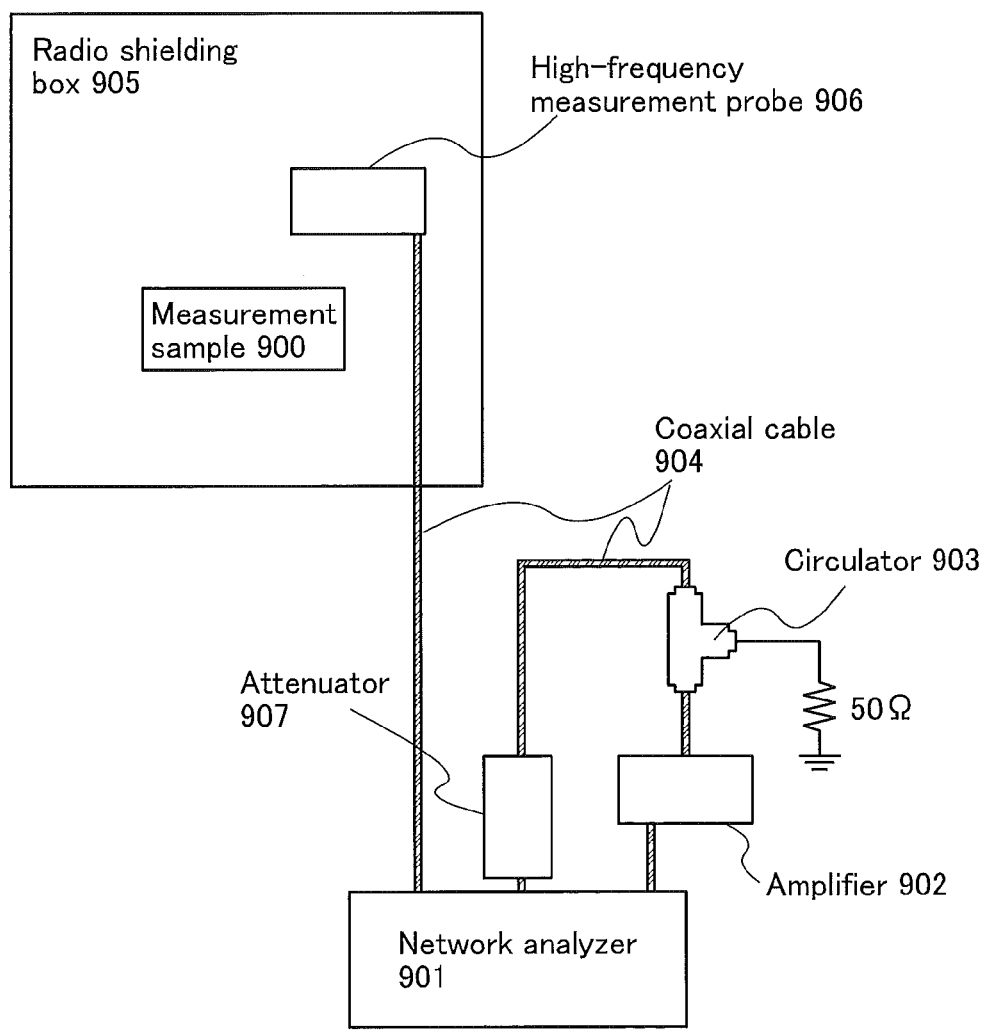
FIG. 9 is a block diagram showing an input-impedance measurement environment of an RF tag applying Embodiment 6 of the present invention.

An input-impedance measurement environment of an RF tag applying this embodiment is shown in FIG. 9.

This measurement was performed as follows: a network analyzer 901 (N5230A produced by Agilent Technologies Inc.), an amplifier 902 (RK-A250L-SMA produced by R&K Co., Ltd.), and a circulator 903 (0100CAS produced by Nova MICROWAVE Inc.) are connected with a coaxial cable 904, and a high-frequency measurement probe 906 (ACP40-LW-GSG-200 produced by Cascade Microtech, Inc.) is provided for a manual prober provided in a radio shielding box 905.

Note that the circulator 903 has three terminals, which are referred to as a terminal 1, a terminal 2, and a terminal 3, and a signal inputted from the terminal 1 is outputted only from the terminal 2, a signal inputted from the terminal 2 is outputted only to the terminal 3, and a signal inputted from the terminal 3 is outputted only to the terminal 1. In this measurement, the terminal 3 is terminated with a resistor of 50Ω and the circulator 903 is used as an isolator where the signal inputted from the terminal 1 is outputted only from the terminal 2. Further, depending on the input impedance of a measurement sample 900, electric power to be inputted to the measurement sample 900 may be reflected. Considering such a case, the amplifier 902 and the circulator 903 are connected to the network analyzer 901 with an attenuator 907 (AT-1003 produced by Hirose Electric Co., Ltd.) therebetween in order to protect the amplifier 902.

Graphs showing input-impedance measurement results of each RF tag applying this embodiment are FIGS. 10A to 10D.

Figure 10A:
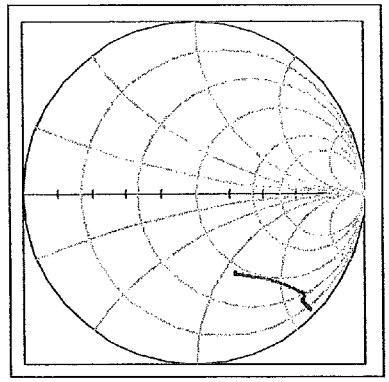
FIGS. 10A to 10F are diagrams of input-impedance measurement results of an RF tag applying Embodiment 6 of the present invention.
Figure 10B:
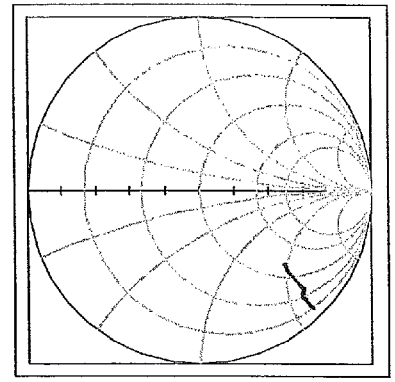

FIG. 10A is, of an RF tag in which a capacitor was provided as a load, a smith chart of input impedance of the RF tag standardized to a resistance of 50Ω, when the input electric power was increased from −2 dBm to 18 dBm with a frequency of 915 MHz. FIG. 10B is, of an RF tag in which a resistor was provided as a load, a smith chart of input impedance of the RF tag standardized to a resistance of 50Ω, when the input electric power was increased from −2 dBm to 18 dBm with a frequency of 915 MHz.

In either case, the input impedance of the RF tag approached 50Ω as the input electric power was increased.

Figure 10C:
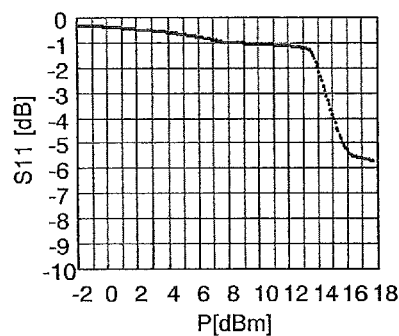
Figure 10D:
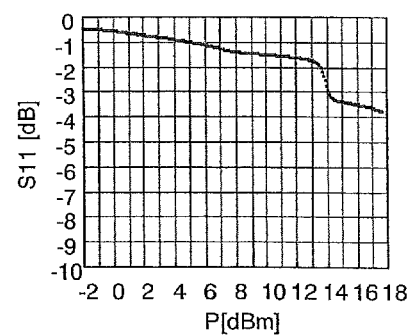

FIG. 10C is, of the RF tag in which a capacitor was provided as a load, a graph of plotting S11 depending on input electric power when the input electric power was increased from −2 dBm to 18 dBm with a frequency of 915 MHz. FIG. 10D is, of the RF tag in which a resistor was provided as a load, a graph of plotting S11 depending on input electric power when the input electric power was increased from −2 dBm to 18 dBm with a frequency of 915 MHz.

S11 was gradually decreased as the input electric power was increased until the input electric power reached 13 dBm. At an input electric power of approximately 14 dBm, S11 was rapidly changed. At an input electric power of equal to or larger than 15 dBm, S11 was gradually decreased again. Thus, it was found that at an input electric power of equal to or larger than 14 dBm, the transistor 202 was turned on and the input impedance of the RF tag was drastically changed.

In order to control the amount of input electric power at which the input impedance of the RF tag is drastically changed, the RF tag may be designed such that the node p has a desired potential. Further, in order to control the amount of change of the input impedance of the RF tag, the RF tag may be designed such that the amount of current to flow into the transistor 202 or the size of the load 201 is desirable.

Figure 10E:
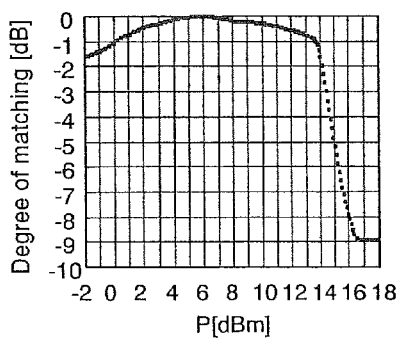
Figure 10F:
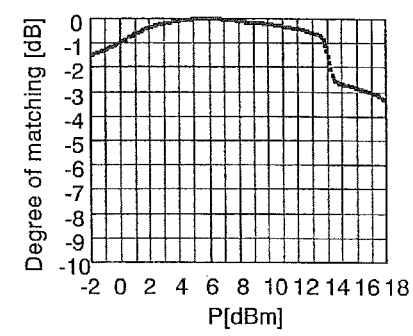

A graph of degree of matching between the chip and the antenna included in each RF tag applying this embodiment is each of FIGS. 10E and 10F.

Note that in this specification, the degree of matching means a ratio of an electric power $P_1$ supplied and an electric power $P_2$ substantially transmitted to inside a device when electric power is supplied to the device. $P_2$ can be calculated in consideration of the reflection coefficient obtained by measuring the input impedance of the device.

FIGS. 10E and 10F are the graphs of degree of matching with supplied electric power of the RF tag in which a capacitor is provided as a load and the RF tag in which a resistor is provided as a load, respectively.

The case at an input electric power of 6 dBm was assumed as a basis, and the degree of matching at this time was set to 0 dB. The degree of matching was decreased as the input electric power was increased until the input electric power reached 13 dBm. At an input electric power of approximately 14 dBm, the degree of matching was rapidly decreased. At an input electric power of equal to or larger than 16 dBm, the degree of matching was equal to or lower than −9 dB. As described above, the following is found: at an input electric power of equal to or larger than 14 dBm, electric power received by the antenna is reflected and the rate of untransmitting the electric power to inside the RF tag is gradually increased, and at an input electric power of equal to or larger than 16 dBm, electric power received by the antenna is totally reflected and is not transmitted to inside the RF tag so much.

In general, the impedance of an antenna does not depend on input electric power so much. That is, the graphs of FIGS. 10E and 10F show how much the impedance matching between the RF tag and the antenna is changed by changing the amount of electric power in the RF tag which is designed such that the input impedance of the RF tag and the impedance of the antenna match with each other with 100% when the minimum operating electric power required for normal operation of the RF tag is supplied.

By the above-described measurement, in the RF tag having the circuit structure described in this embodiment, a change in input impedance of the chip itself depending on input electric power could be observed practically. Since impedance of the chip itself 120 was changed such that the impedance matching between the chip itself 120 and the antenna 112 could be deviated intentionally, a large amount of electric power which might be received by the antenna 112 was not transmitted to the chip itself 120 so much, and therefore, the RF tag could be operated without deteriorating an internal element of the RF tag or destroying the RF tag itself.

As described above, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 2)

As a deformation example of the input circuit portion according to Embodiment 1 of the present invention, the load 201 in FIG. 3 can be eliminated.

Even in the case where the load 201 is eliminated, the impedance of the chip itself 120 is changed depending on whether the transistor 202 is turned on or off, that is, whether current flows into the transistor 202 or not. In accordance with the desired degree of change of the impedance of the chip itself 120, the amount of current to flow into the transistor 202 can be estimated. Therefore, the size of the transistor 202 may be designed such that an enough amount of current by which the impedance of the chip itself 120 is changed can flow therethrough.

In this manner, even in the case where the load 201 is not included, by current flowing through the transistor 202, the impedance of the chip itself 120 is changed and impedance matching between the chip itself 120 and the antenna 112 can be deviated intentionally. Therefore, since a large amount of electric power which may be received by the antenna 112 is not transmitted to the chip itself 120 so much, the RF tag can be operated without deteriorating an internal element of the RF tag or destroying the RF tag itself.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 3)

As another deformation example of the input circuit portion according to Embodiment 1 of the present invention, the protection circuit portion may be disposed between the capacitor 304 and the diode 301 in the rectifier circuit portion 300.

An input circuit portion according to Embodiment 3 of the present invention is described with reference to FIG. 4.

Figure 4:
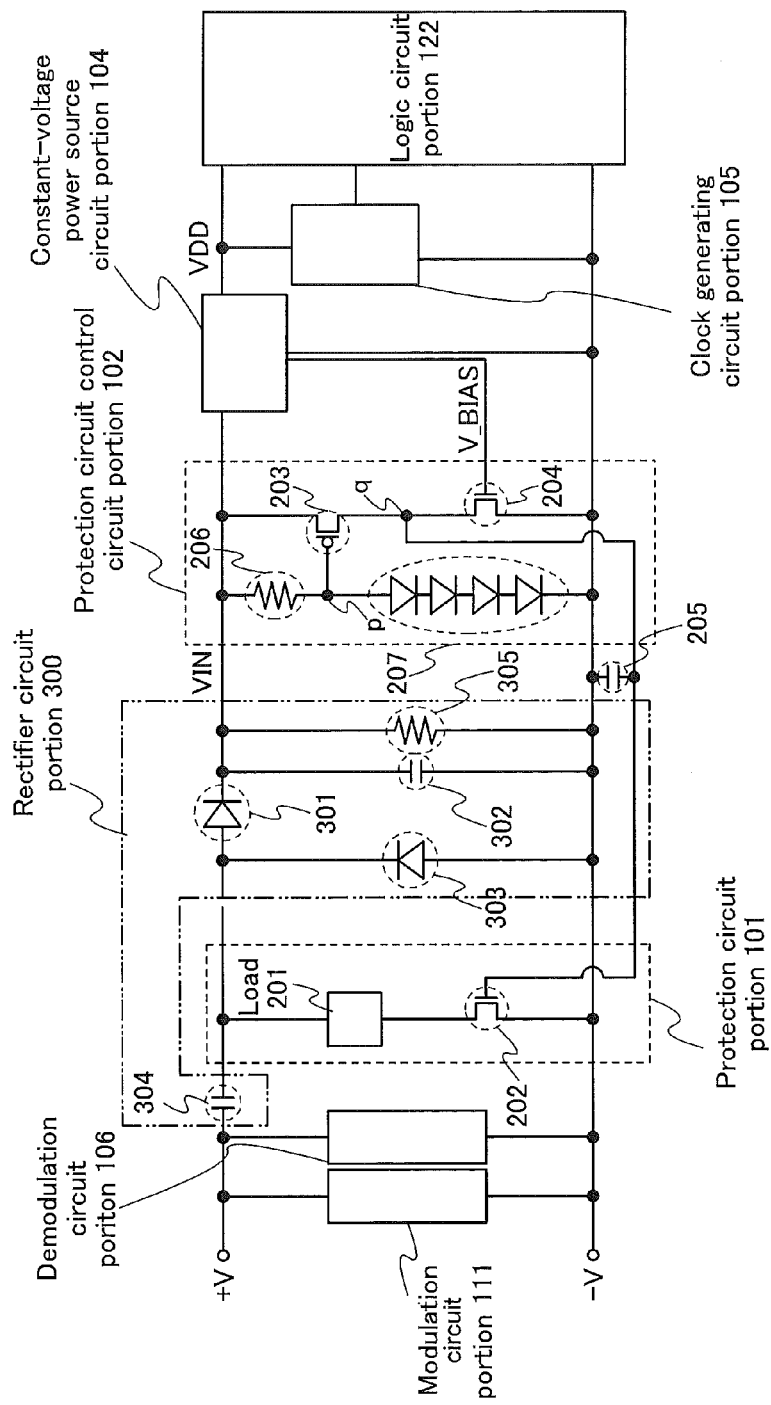
FIG. 4 is a diagram showing a deformation example of an input circuit portion according to Embodiment 3 of the present invention.

In FIG. 4, a terminal denoted by +V is connected to the + terminal of the antenna 112 and a terminal denoted by −V is connected to the − terminal of the antenna 112. A signal encoded in the encoding circuit portion 110 is inputted into the modulation circuit portion 111 and load modulation is performed therein. The demodulation circuit portion 106 demodulates an electric wave inputted from the +V terminal and outputs a signal after being demodulated. The signal after being demodulated is inputted into the encoding circuit portion in the logic circuit portion 122. A voltage VIN which is rectified in a rectifier circuit portion 300 and a voltage of the −V terminal are inputted to the constant-voltage power source circuit portion 104, and the constant-voltage power source circuit portion 104 outputs the power source voltage VDD which is made constant and the reference voltage V_BIAS. The VDD terminal is connected to the clock generating circuit portion 105 and the logic circuit portion 122, and supplies electric power to each circuit. The V_BIAS terminal is connected to the protection circuit control circuit portion 102 so that the reference voltage for determining the potential of the node q is made. The power source voltage VDD and the voltage of the −V terminal are inputted to the clock generating circuit portion 105 and the clock generating circuit portion 105 outputs a reference clock signal. The output terminal of the clock generating circuit portion 105 is connected to the logic circuit portion 122 so that a clock signal is supplied to each circuit in the logic circuit portion 122.

The rectifier circuit portion 300 includes the diode 301 to convert (rectify) an alternating-current power source voltage inputted from the +V terminal to a direct-current power source voltage and charge a capacitor 302, a diode 303 to convert (rectify) an alternating-current power source voltage inputted from the −V terminal to a direct-current power source voltage and charge a capacitor 304, the capacitor 302 to store the direct-current power source voltage rectified in the diode 301, and the capacitor 304 to detect an electric wave inputted from the +V terminal and store the charge rectified in the diode 303. Note that the RF tag is preferably provided with the resistor 305 to discharge a charge accumulated in the chip itself 120 at the time of reset (nonoperating state).

The output terminal of the diode 301 is connected to the capacitor 302, and the input terminal thereof is connected to the capacitor 304. One terminal of the capacitor 302 is connected to the diode 301 and the other terminal thereof is connected to the −V terminal. One terminal of the capacitor 304 is connected to the +V terminal and the other terminal thereof is connected to the diode 303. In this specification, an output terminal of the rectifier circuit portion 300 is referred to as a VIN terminal.

Further, in the RF tag, when the resistor 305 to discharge a charge accumulated in the chip itself 120 at the time of reset (nonoperating state) is provided, one terminal of the resistor 305 is connected to the VIN terminal and the other terminal thereof is connected to the −V terminal.

The protection circuit portion 101 and the protection circuit control circuit portion 102 shown in FIG. 4 are described in detail below.

The protection circuit control circuit portion 102 includes the transistor 204 which is driven by the reference voltage (V_BIAS) generated in the constant-voltage power source circuit portion 104, the phase compensation capacitor 205, the diode 207 to determine the potential of the node p, the resistor 206, and the transistor 203 to receive a change of the potential of the node p and change the potential of the node q.

The protection circuit portion 101 includes the transistor 202 to determine whether or not to supply current to the load 201 and the load 201 through which current flows when the transistor 202 is turned on to change the input impedance of the chip itself 120.

One terminal of the resistor 206 is connected to the VIN terminal and the other terminal thereof is connected to the diode 207 in series. One terminal of the diode 207 is connected to the resistor 206 and the other terminal thereof is connected to the −V terminal. In FIG. 4, the connection point between the resistor 206 and the diode 207 is referred to as the node p. The gate electrode of the transistor 203 is connected to the node p, the source electrode thereof is connected to the +V terminal, and the drain electrode thereof is connected to the transistor 204. The gate electrode of the transistor 204 is connected to the reference voltage (V_BIAS) output terminal of the constant-voltage power source circuit portion 104, the source electrode thereof is connected to the −V terminal, and the drain electrode thereof is connected to the transistor 203. In FIG. 4, the connection point between the transistor 204 and the transistor 203 is referred to as the node q. The capacitor 205 is connected between the source terminal and the drain terminal of the transistor 204. Further, the drain electrode of the transistor 204 is connected to the gate electrode of the transistor 202. The gate electrode of the transistor 202 is connected to the drain electrode of the transistor 204, the source electrode thereof is connected to the −V terminal, and the drain electrode thereof is connected to the load 201. One terminal of the load 201 is connected to the drain electrode of the transistor 202 and the other terminal thereof is connected to the +V terminal.

In FIG. 4, an example where four diodes 207 are connected in series is described; however, the number of diodes is not limited to this as long as the potential of the node p can be kept to the potential which does not turn on the transistor 203 at the time of normal driving (when the protection circuit portion 101 is not operated).

Note that as each of the diodes 207, 301, and 303, a diode element is not necessarily used, a MOS transistor with gate and drain electrodes electrically connected to each other may be used.

In FIG. 4, when the communication distance is appropriate and the RF tag operates normally, the voltage (V_BIAS) applied to the gate electrode of the transistor 204 is constant due to the function of the constant-voltage power source circuit portion 104, so that the transistor 204 functions as a constant current source.

Further, when the potential of the node p is lower than the threshold voltage of the diode 207, the transistor 203 is turned off and the potential of the node q is kept to the potential which is higher than the potential of the −V terminal by the threshold voltage of the transistor 204.

The drain electrode of the transistor 204 is connected to the gate electrode of the transistor 202 and the transistor 202 is turned off. Therefore, little current flows into the load 201 and the input impedance of the chip itself 120 does not change. The RF tag 100, therefore, operates normally.

When the communication distance is extremely short and a large amount of electric power is supplied to the RF tag, the potential of the node p becomes higher than the threshold voltage of the diode 207 and current flows into the diode 207, so that the potential of the node p is decreased. In accordance with this, the transistor 203 is turned on.

When the transistor 203 is turned on and current flows into the node q, the potential of the node q is increased. When the potential of the node q becomes higher than the threshold voltage of the transistor 202, the transistor 202 is turned on and current flows into the load 201.

When current flows into the load 201, the impedance of the chip itself 120 is changed.

To change the input impedance of the chip itself 120 means that the impedance matching between the antenna 112 and the chip itself 120 is deviated. In other words, the reflection coefficient is increased.

In general, electric-power reflection occurs when matching between output impedance on the side of supplying electric power and input impedance on the side of receiving electric power is deviated, and the transmission efficiency of electric power is decreased. That is, in order to efficiently transmit electric power received by the antenna 112 to the chip itself 120, matching impedance between the antenna 112 and the chip itself 120 is required.

The above-described property is used in this embodiment, too. When the communication distance is extremely short and a large amount of electric power is supplied to the RF tag, current is supplied to the load 201 to change the impedance of the chip itself 120, so that the impedance matching between the chip itself 120 and the antenna 112 is deviated intentionally. Accordingly, a large amount of electric power which may be received by the antenna 112 is not transmitted to the chip itself 120 so much, and therefore, the RF tag can be operated without deteriorating an internal element of the RF tag or destroying the RF tag itself.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 4)

As a deformation example of the input circuit portion according to Embodiment 3 of the present invention, the load 201 in FIG. 4 can be eliminated.

Even in the case where the load 201 is eliminated, the impedance of the chip itself 120 is changed depending on whether the transistor 202 is turned on or off, that is, whether current flows into the transistor 202 or not. In accordance with the desired degree of change of the impedance of the chip itself 120, the amount of current to flow into the transistor 202 can be estimated. Therefore, the size of the transistor 202 may be designed such that an enough amount of current by which the impedance of the chip itself 120 is changed can flow therethrough.

In this manner, even in the case where the load 201 is not included, by current flowing through the transistor 202, the impedance of the chip itself 120 is changed and impedance matching between the chip itself 120 and the antenna 112 can be deviated intentionally. Therefore, since a large amount of electric power which may be received by the antenna 112 is not transmitted to the chip itself 120 so much, the RF tag can be operated without deteriorating an internal element of the RF tag or destroying the RF tag itself.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 5)

An input circuit portion according to Embodiment 5 of the present invention is described with reference to FIG. 5.

Figure 5:
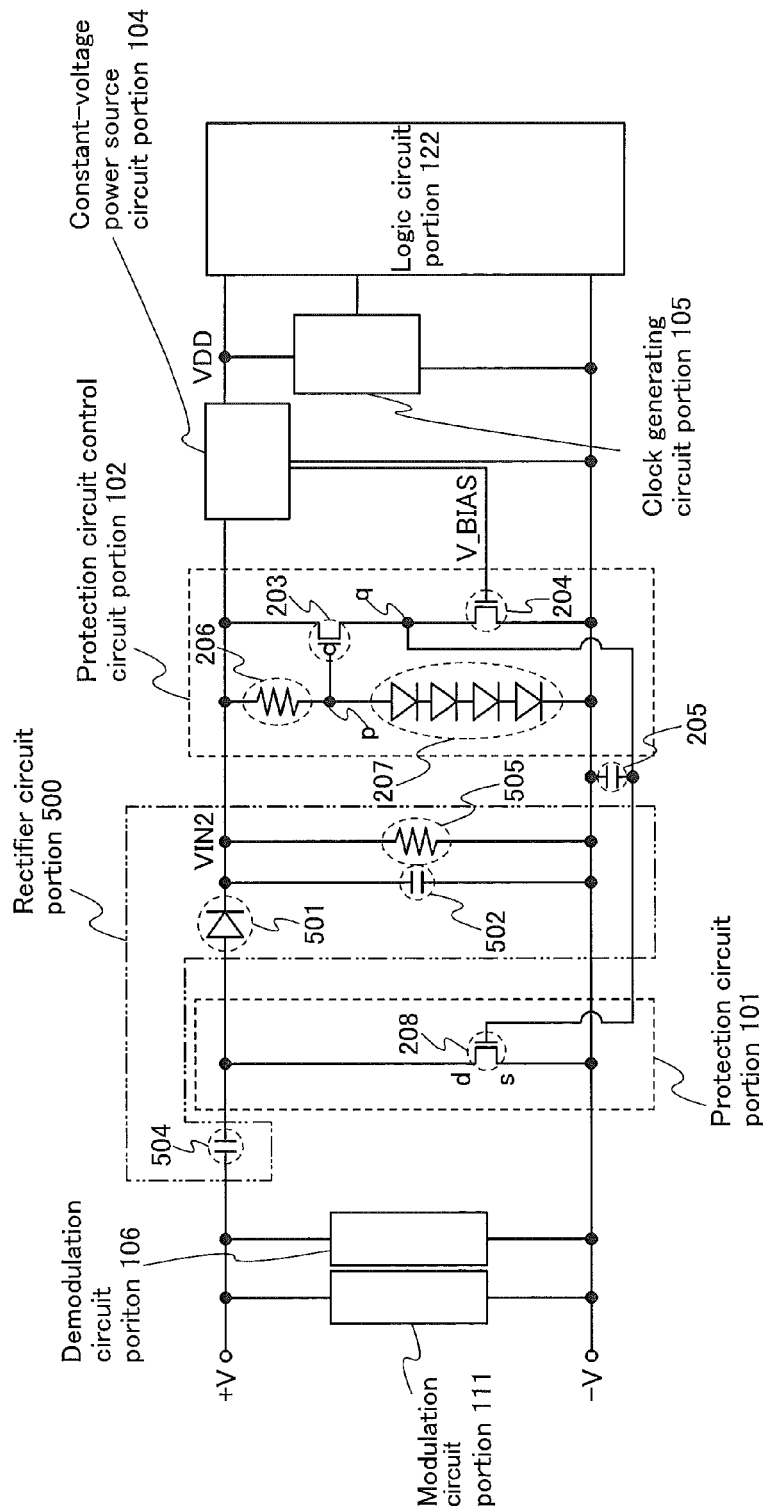
FIG. 5 is a diagram showing a deformation example of an input circuit portion according to Embodiment 5 of the present invention.

In FIG. 5, a terminal denoted by +V is connected to the + terminal of the antenna 112 and a terminal denoted by −V is connected to the − terminal of the antenna 112. A signal encoded in the encoding circuit portion 110 is inputted into the modulation circuit portion 111 and load modulation is performed therein. The demodulation circuit portion 106 demodulates an electric wave inputted from the +V terminal and outputs a signal after being demodulated. The signal after being demodulated is inputted into the encoding circuit portion in the logic circuit portion 122. A voltage YIN which is rectified in a rectifier circuit portion 500 and a voltage of the −V terminal are inputted to the constant-voltage power source circuit portion 104, and the constant-voltage power source circuit portion 104 outputs the power source voltage VDD which is made constant and the reference voltage V_BIAS. The VDD terminal is connected to the clock generating circuit portion 105 and the logic circuit portion 122, and supplies electric power to each circuit. The V_BIAS terminal is connected to the protection circuit control circuit portion 102 so that the reference voltage for determining the potential of the node q is made. The power source voltage VDD and the voltage of the −V terminal are inputted to the clock generating circuit portion 105 and the clock generating circuit portion 105 outputs a reference clock signal. The output terminal of the clock generating circuit portion 105 is connected to the logic circuit portion 122 so that a clock signal is supplied to each circuit in the logic circuit portion 122.

The protection circuit portion 101 and the protection circuit control circuit portion 102 shown in FIG. 5 are described in detail below.

The protection circuit control circuit portion 102 includes the transistor 204 which is driven by the reference voltage (V_BIAS) generated in the constant-voltage power source circuit portion 104, the phase compensation capacitor 205, the diode 207 to determine the potential of the node p, the resistor 206, and the transistor 203 to receive a change of the potential of the node p and change the potential of the node q. The protection circuit portion 101 includes a transistor 208 which is controlled by changing the potential of the node q, to supply a charge to a capacitor 504 when the potential of the −V terminal is higher than that of the +V terminal.

The rectifier circuit portion 500 includes a diode 501 to convert (rectify) an alternating-current power source voltage inputted from the +V terminal to a direct-current power source voltage and charge a capacitor 502, the capacitor 502 to store the direct-current power source voltage rectified in the diode 501, and the capacitor 504 to detect an electric wave inputted from the +V terminal and store the charge supplied from the transistor 208. Note that the RF tag is preferably provided with a resistor 505 to discharge a charge accumulated in the chip itself 120 at the time of reset (nonoperating state).

An output terminal of the diode 501 is connected to the capacitor 502, and an input terminal thereof is connected to the capacitor 504. One terminal of the capacitor 502 is connected to the diode 501 and the other terminal thereof is connected to the −V terminal. One terminal of the capacitor 504 is connected to the +V terminal and the other terminal thereof is connected to the transistor 208. In this specification, an output terminal of the rectifier circuit portion 500 is referred to as a VIN2 terminal.

Further, in the RF tag, when the resistor 505 to discharge a charge accumulated in the chip itself 120 at the time of reset (nonoperating state) is provided, one terminal of the resistor 505 is connected to the VIN2 terminal and the other terminal thereof is connected to the −V terminal.

As each of the diodes 207 and 501, a diode element is not necessarily used, a MOS transistor with gate and drain electrodes electrically connected to each other may be used.

One terminal of the resistor 206 is connected to the VIN2 terminal and the other terminal thereof is connected to the diode 207 in series. One terminal of the diode 207 is connected to the resistor 206 and the other terminal thereof is connected to the −V terminal. In FIG. 5, the connection point between the resistor 206 and the diode 207 is referred to as the node p. The gate electrode of the transistor 203 is connected to the node p, the source electrode thereof is connected to the +V terminal, and the drain electrode thereof is connected to the transistor 204. The gate electrode of the transistor 204 is connected to the reference voltage (V_BIAS) output terminal of the constant-voltage power source circuit portion 104, the source electrode thereof is connected to the −V terminal, and the drain electrode thereof is connected to the transistor 203. In FIG. 5, the connection point between the transistor 204 and the transistor 203 is referred to as the node q. The capacitor 205 is connected between the source terminal and the drain terminal of the transistor 204. Further, the drain electrode of the transistor 204 is connected to a gate electrode of the transistor 208. The gate electrode of the transistor 208 is connected to the drain electrode of the transistor 204, an electrode denoted by s thereof in FIG. 5 is connected to the −V terminal, and an electrode denoted by d thereof in FIG. 5 is connected to one terminal of the capacitor 504 of the rectifier circuit portion 500.

In FIG. 5, an example where four diodes 207 are connected in series is described; however, the number of diodes is not limited to this as long as the potential of the node p can be kept to the potential which does not turn on the transistor 203 at the time of normal driving (when the protection circuit portion 101 is not operated).

When the communication distance is appropriate and the RF tag operates normally, the voltage (V_BIAS) applied to the gate electrode of the transistor 204 is constant due to the function of the constant-voltage power source circuit portion 104, so that the transistor 204 functions as a constant current source.

Further, when the potential of the node p is lower than the threshold voltage of the diode 207, the transistor 203 is turned off and the potential of the node q is kept to the potential which is higher than the potential of the −V terminal by the threshold voltage of the transistor 204.

The drain electrode of the transistor 204 is connected to the gate electrode of the transistor 208 and the transistor 208 is turned off. Therefore, the input impedance of the chip itself 120 does not change and the RF tag 100 operates normally.

When the communication distance is extremely short and a large amount of electric power is supplied to the RF tag, the potential of the node p becomes higher than the threshold voltage of the diode 207 and current flows into the diode 207, so that the potential of the node p is decreased. In accordance with this, the transistor 203 is turned on.

When the transistor 203 is turned on and current flows into the node q, the potential of the node q is increased. When the potential of the node q becomes higher than the threshold voltage of the transistor 208, the transistor 208 is turned on. At this time, the direction of current flowing between the source and drain electrodes of the transistor 208 is inverted by the input electric power. When the potential of the drain electrode is lower than that of the source electrode, current flows in the direction from s to d so that the capacitor 502 is charged. When the potential of the drain electrode is higher than that of the source electrode, current flows in the direction from d to s so that the amount of current flowing into the diode 501 is decreased.

In addition, when the current flows in the direction from s to d of the transistor 208 in FIG. 5, the impedance of the chip itself 120 is changed as compared to that when no current flows therethrough.

To change the input impedance of the chip itself 120 means that the impedance matching between the antenna 112 and the chip itself 120 is deviated. In other words, the reflection coefficient is increased.

In general, electric-power reflection occurs when matching between output impedance on the side of supplying electric power and input impedance on the side of receiving electric power is deviated, and the transmission efficiency of electric power is decreased. That is, in order to efficiently transmit electric power received by the antenna 112 to the chip itself 120, matching impedance between the antenna 112 and the chip itself 120 is required.

The above-described property is used in this embodiment, too. When the communication distance is extremely short and a large amount of electric power is supplied to the RF tag, current is supplied to the transistor 208 in the direction from the source terminal to the drain terminal to change the impedance of the chip itself 120, so that the impedance matching between the chip itself 120 and the antenna 112 is deviated intentionally. Accordingly, a large amount of electric power which may be received by the antenna 112 is not transmitted to the chip itself 120 so much, and therefore, the RF tag can be operated without deteriorating an internal element of the RF tag or destroying the RF tag itself.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 6)

Figure 6:
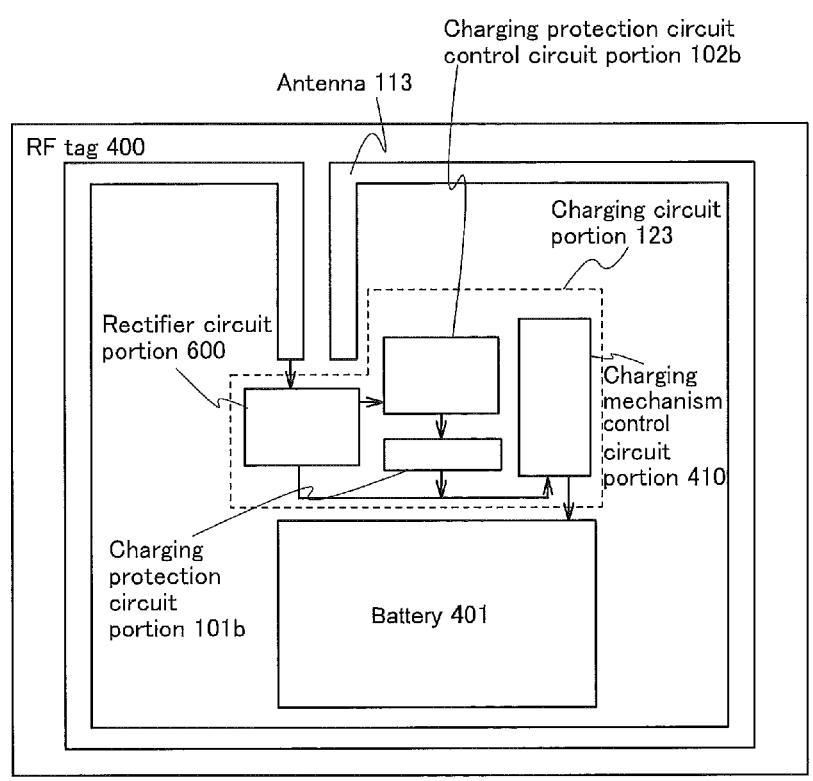
FIG. 6 is a block diagram showing Embodiment 6 of the present invention.

Embodiment 6 of the present invention is described with reference to FIG. 6.

An RF tag 400 of the present invention includes an antenna 113 to receive electric power and data from a reader/writer, a battery 401, and a charging circuit portion 123 to control charging/discharging of the battery 401.

The charging circuit portion 123 includes a charging mechanism control circuit portion 410 to monitor a power source voltage rectified in a rectifier circuit portion 600 and manage a charging condition of the battery 401, the rectifier circuit portion 600 to convert electric power received from the antenna 113 from alternating current to direct current, a charging protection circuit portion 101b to protect an internal circuit when electric power received from the antenna 113 is excessively large, and a charging protection circuit control circuit portion 102b (also called a charging comparison circuit) to control whether or not to operate the charging protection circuit portion 101b.

Note that the antenna 113 and both of the charging circuit portion 123 and the battery 401 can be formed separately and then connected to each other to form the RF tag. It is more preferable that the antenna 113 and both of the charging circuit portion 123 and the battery 401 are formed by the same process.

In this specification, a battery refers to a battery which can restore continuous operating time by being charged.

Note that, as a battery, for example, a lithium battery, and more preferably, a battery formed in a sheet shape such as a lithium polymer battery using a gel-like electrolyte, a lithium ion battery, or the like is used. By using the sheet-shape battery, the battery can be reduced in size (thickness). Of course, any battery can be used as long as the battery can be charged, and a battery capable of charging and discharging such as a nickel-metal-hydride battery or a nickel-cadmium battery, or a capacitor having high capacity or the like may be used as well.

A structure of the charging circuit portion according to Embodiment 6 of the present invention is described with reference to FIG. 7.

Figure 7:
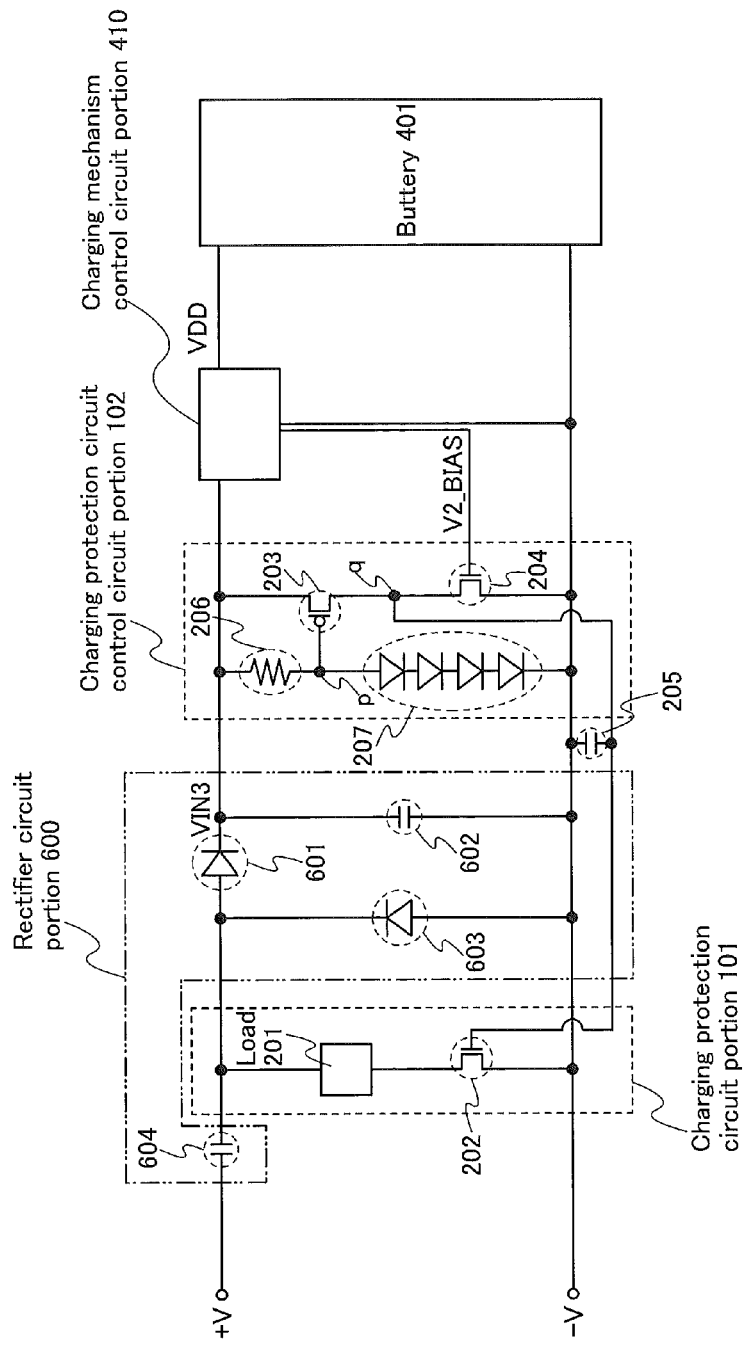
FIG. 7 is a block diagram showing Embodiment 6 of the present invention.

In FIG. 7, a terminal denoted by +V2 is connected to a +V terminal of the antenna 113 and a terminal denoted by −V2 is connected to a −V terminal of the antenna 113. A power source VIN2 which is rectified in the rectifier circuit portion 600 is inputted to the charging mechanism control circuit portion 410, and the charging mechanism control circuit portion 410 outputs a power source voltage VDD2 which is made constant and a reference voltage V2_BIAS. The power source voltage VDD2 which is made constant is supplied to the battery 401. The reference voltage V2_BIAS is supplied to the charging protection circuit control circuit portion 102b.

The rectifier circuit portion 600 includes a diode 601 to convert (rectify) an alternating-current power source voltage inputted from the +V2 terminal to a direct-current power source voltage and charge a capacitor 602, a diode 603 to convert (rectify) an alternating-current power source voltage inputted from the −V2 terminal to a direct-current power source voltage and charge a capacitor 604, the capacitor 602 to store the direct-current power source voltage rectified in the diode 601, and the capacitor 604 to detect an electric wave inputted from the +V2 terminal and store the charge rectified in the diode 603.

An output terminal of the diode 601 is connected to the capacitor 602, and an input terminal thereof is connected to the capacitor 604. One terminal of the capacitor 602 is connected to the diode 601 and the other terminal thereof is connected to the −V2 terminal. An output terminal of the diode 603 is connected to the capacitor 604, and an input terminal thereof is connected to the −V2 terminal. One terminal of the capacitor 604 is connected to the +V2 terminal and the other terminal thereof is connected to the diode 603. In this specification, an output terminal of the rectifier circuit portion 600 is referred to as a VIN3 terminal.

The charging protection circuit portion 101b and the charging protection circuit control circuit portion 102b are described in detail below.

The charging protection circuit control circuit portion 102b includes the transistor 204 which is driven by the reference voltage (V2_BIAS) generated in the charging mechanism control circuit portion 410, the phase compensation capacitor 205, the diode 207 to determine the potential of the node p, the resistor 206, and the transistor 203 to receive a change of the potential of the node p and change the potential of the node q.

The charging protection circuit portion 101b includes the transistor 202 to determine whether or not to supply current to the load 201 and the load 201 through which current flows when the transistor 202 is turned on to change the input impedance of the chip itself 120.

The load 201 controls the amount of change of the input impedance of the chip itself 120 depending on an output of the charging protection circuit control circuit portion 102b (the potential of the node q). For example, the load 201 is formed of a capacitor, a resistor, an inductor, or the like.

One terminal of the resistor 206 is connected to the VIN3 terminal and the other terminal thereof is connected to the diode 207 in series. One terminal of the diode 207 is connected to the resistor 206 and the other terminal thereof is connected to the −V2 terminal. In FIG. 7, the connection point between the resistor 206 and the diode 207 is referred to as the node p. The gate electrode of the transistor 203 is connected to the node p, the source electrode thereof is connected to the VIN2 terminal, and the drain electrode thereof is connected to the transistor 204. The gate electrode of the transistor 204 is connected to the reference voltage (V2_BIAS) output terminal of the charging mechanism control circuit portion 410, the source electrode thereof is connected to the −V2 terminal, and the drain electrode thereof is connected to the transistor 203. In FIG. 7, the connection point between the transistor 204 and the transistor 203 is referred to as the node q. The capacitor 205 is connected between the source terminal and the drain terminal of the transistor 204. Further, the drain electrode of the transistor 204 is connected to the gate electrode of the transistor 202. The gate electrode of the transistor 202 is connected to the drain electrode of the transistor 204, the source electrode thereof is connected to the −V2 terminal, and the drain electrode thereof is connected to the load 201. One terminal of the load 201 is connected to the drain electrode of the transistor 202 and the other terminal thereof is connected to the +V2 terminal.

In FIG. 7, an example where four diodes 207 are connected in series is described; however, the number of diodes is not limited to this as long as the potential of the node p can be kept to the potential which does not turn on the transistor 203 at the time of noimal driving (when the charging protection circuit portion 101b is not operated).

Note that as each of the diodes 207, 601, and 603, a diode element is not necessarily used, a MOS transistor with gate and drain electrodes electrically connected to each other may be used.

When the communication distance is appropriate and the RF tag operates normally, the voltage (V2_BIAS) applied to the gate electrode of the transistor 204 is constant due to the function of the charging mechanism control circuit portion 410, so that the transistor 204 functions as a constant current source.

Further, when the potential of the node p is lower than the threshold voltage of the diode 207, the transistor 203 is turned off and the potential of the node q is kept to the potential which is higher than the potential of the −V2 terminal by the threshold voltage of the transistor 204.

The drain electrode of the transistor 204 is connected to the gate electrode of the transistor 202 and the transistor 202 is turned off. Therefore, the input impedance of the chip itself 120 does not change, and the RF tag 400 operates normally.

When the communication distance is extremely short and a large amount of electric power is supplied to the RF tag, the potential of the node p becomes higher than the threshold voltage of the diode 207 and current flows into the diode 207, so that the potential of the node p is decreased. In accordance with this, the transistor 203 is turned on.

When the transistor 203 is turned on and current flows into the node q, the potential of the node q is increased. When the potential of the node q becomes higher than the threshold voltage of the transistor 202, the transistor 202 is turned on and current flows into the load 201.

When current flows into the load 201, the impedance of the chip itself 120 is changed.

To change the input impedance of the charging circuit portion 123 from the antenna 113 side means that the impedance matching between the antenna 113 and the charging circuit portion 123 is deviated. In other words, the reflection coefficient is increased.

In general, electric-power reflection occurs when matching between output impedance on the side of supplying electric power and input impedance on the side of receiving electric power is deviated, and the transmission efficiency of electric power is decreased. That is, in order to efficiently transmit electric power received by the antenna 113 to the charging circuit portion 123, matching impedance between the antenna 113 and the charging circuit portion 123 is required.

The above-described property is used in this embodiment, too. When the communication distance is extremely short and a large amount of electric power is supplied to the RF tag, current is supplied to the load 201 to change the impedance of the charging circuit portion 123, so that the impedance matching between the charging circuit portion 123 and the antenna 113 is deviated intentionally Accordingly, a large amount of electric power which may be received by the antenna 113 is not transmitted to the charging circuit portion 123 so much, and therefore, the battery 401 can be charged without deteriorating an internal element of the RF tag or destroying the RF tag itself.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 7)

Figure 8:
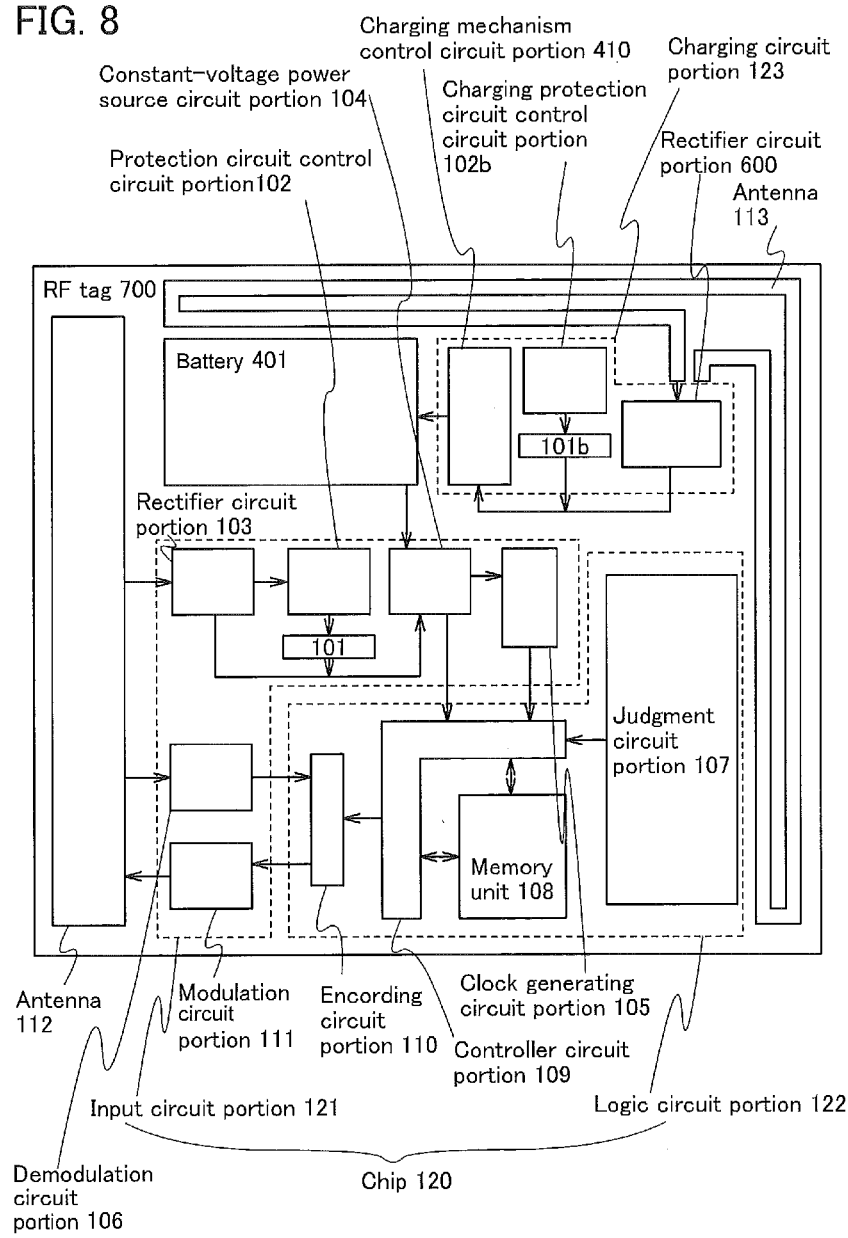
FIG. 8 is a diagram showing one structure example of an input circuit portion according to Embodiment 7 of the present invention.

Embodiment 7 of the present invention is described with reference to FIG. 8.

An RF tag 700 of the present invention includes the antenna 112 to receive electric power and data from a reader/writer, the antenna 113 to receive an electric wave required for charging the battery 401, and the chip itself 120 including the input circuit portion 121, the logic circuit portion 122, and the charging circuit portion 123. Note that the antenna 112 can be formed separately from the chip itself 120 and then they can be provided over the same substrate. It is more preferable that the antenna 112 and the chip itself 120 are formed over the same substrate.

The input circuit portion 121 of the RF tag 700 includes the rectifier circuit portion 103 to convert electric power received by the antenna 112 from alternating current into direct current, the constant-voltage power source circuit portion 104 to supply a constant voltage to an internal circuit, the protection circuit portion 101 to protect the internal circuit when the amount of electric power received by the antenna 112 is excessively large, the protection circuit control circuit portion 102 to control whether or not to operate the protection circuit portion 101, the clock generating circuit portion 105 to generate a clock signal supplied to the internal circuit, the demodulation circuit portion 106 to demodulate data received from the antenna 112 to a digital signal, and the modulation circuit portion 111 to modulate encoded data.

The logic circuit portion 122 of the RF tag 700 includes an instruction analysis portion to analyze data demodulated in the demodulation circuit portion 106, the judgment circuit portion 107 to judge whether demodulated data is received normally or not, the memory unit (hereinafter referred to as a memory) 108, the controller circuit portion 109 to control the memory, and the encoding circuit portion 110 to encode data.

To the input circuit portion 121 of this embodiment, any structure example of Embodiments 1 to 5 can be applied. Further, the protection circuit portion 101 and the protection circuit control circuit portion 102 in the input circuit portion 121 are not necessarily connected and only the charging circuit portion 123 described below may be connected. The case where the input circuit portion 121 of Embodiment 1 is used is described below with reference to FIG. 3.

In FIG. 3, the terminal denoted by +V is connected to the + terminal of the antenna 112 and the terminal denoted by −V is connected to the − terminal of the antenna 112. A signal encoded in the encoding circuit portion 110 is inputted into the modulation circuit portion 111 and load modulation is performed therein. The demodulation circuit portion 106 demodulates an electric wave inputted from the +V terminal and outputs a signal after being demodulated. The signal after being demodulated is inputted into the encoding circuit portion in the logic circuit portion 122.

The voltage VIN which is rectified in the rectifier circuit portion 103 and the voltage of the −V terminal are inputted to the constant-voltage power source circuit portion 104, and the constant-voltage power source circuit portion 104 outputs the power source voltage VDD which is made constant and the reference voltage V_BIAS. The VDD terminal is connected to the clock generating circuit portion 105 and the logic circuit portion 122, and supplies electric power to each circuit. The V_BIAS terminal is connected to the protection circuit control circuit portion 102 so that the reference voltage for determining the potential of the node q is made. The power source voltage VDD and the voltage of the −V terminal are inputted to the clock generating circuit portion 105 and the clock generating circuit portion 105 outputs the reference clock signal. The output terminal of the clock generating circuit portion 105 is connected to the logic circuit portion 122 so that the clock signal is supplied to each circuit in the logic circuit portion 122.

The rectifier circuit portion 103 includes the diode 301 to convert (rectify) an alternating-current power source voltage inputted from the +V terminal to a direct-current power source voltage and charge the capacitor 302, the diode 303 to convert (rectify) an alternating-current power source voltage inputted from the −V terminal to a direct-current power source voltage and charge the capacitor 304, the capacitor 302 to store the direct-current power source voltage rectified in the diode 301, and the capacitor 304 to detect an electric wave inputted from the +V terminal and store the charge rectified in the diode 303. Note that the RF tag is preferably provided with the resistor 305 to discharge a charge accumulated in the chip itself 120 at the time of reset (nonoperating state).

The output terminal of the diode 301 is connected to the capacitor 302, and the input terminal thereof is connected to the capacitor 304. One terminal of the capacitor 302 is connected to the diode 301 and the other terminal thereof is connected to the −V terminal. The output terminal of the diode 303 is connected to the capacitor 304, and the input terminal thereof is connected to the −V terminal. One terminal of the capacitor 304 is connected to the +V terminal and the other terminal thereof is connected to the diode 303. In this specification, the output terminal of the rectifier circuit portion 103 is referred to as the VIN terminal.

Further, in the RF tag, when the resistor 305 to discharge a charge accumulated in the chip itself 120 at the time of reset (nonoperating state) is provided, one terminal of the resistor 305 is connected to the VIN terminal and the other terminal thereof is connected to the −V terminal.

The protection circuit portion 101 and the protection circuit control circuit portion 102 are described in detail below.

The protection circuit control circuit portion 102 includes the transistor 204 which is driven by the reference voltage (V_BIAS) generated in the constant-voltage power source circuit portion 104, the phase compensation capacitor 205, the diode 207 to determine the potential of the node p, the resistor 206, and the transistor 203 to receive the change of the potential of the node p and change the potential of the node q.

The protection circuit portion 101 includes the transistor 202 to determine whether or not to supply current to the load 201 and the load 201 through which current flows when the transistor 202 is turned on to change the input impedance of the chip itself 120.

The load 201 controls the amount of change of the input impedance of the chip itself 120 depending on the output of the protection circuit control circuit portion 102 (the potential of the node q). For example, the load 201 is formed of a capacitor, a resistor, an inductor, or the like.

One terminal of the resistor 206 is connected to the VIN terminal and the other terminal thereof is connected to the diode 207 in series. One terminal of the diode 207 is connected to the resistor 206 and the other terminal thereof is connected to the −V terminal. In FIG. 3, the connection point between the resistor 206 and the diode 207 is referred to as the node p. The gate electrode of the transistor 203 is connected to the node p, the source electrode thereof is connected to the VIN terminal, and the drain electrode thereof is connected to the transistor 204. The gate electrode of the transistor 204 is connected to the reference voltage (VBIAS) output terminal of the constant-voltage power source circuit portion 104, the source electrode thereof is connected to the −V terminal, and the drain electrode thereof is connected to the transistor 203. In FIG. 3, the connection point between the transistor 204 and the transistor 203 is referred to as the node q. The capacitor 205 is connected between the source terminal and the drain terminal of the transistor 204. Further, the drain electrode of the transistor 204 is connected to the gate electrode of the transistor 202. The gate electrode of the transistor 202 is connected to the drain electrode of the transistor 204, the source electrode thereof is connected to the −V terminal, and the drain electrode thereof is connected to the load 201. One terminal of the load 201 is connected to the drain electrode of the transistor 202 and the other terminal thereof is connected to the +V terminal.

In FIG. 3, an example where four diodes 207 are connected in series is described; however, the number of diodes is not limited to this as long as the potential of the node p can be kept to the potential which does not turn on the transistor 203 at the time of normal driving (when the protection circuit portion 101 is not operated).

Note that as each of the diodes 207, 301, and 303, a diode element is not necessarily used, a MOS transistor with gate and drain electrodes electrically connected to each other may be used.

The case where the structure of Embodiment 6 is used for the charging circuit portion 123 of this embodiment is described with reference to FIG. 7.

The charging circuit portion 123 includes the charging mechanism control circuit portion 410 to monitor the power source voltage rectified in the rectifier circuit portion 600 and manage the charging condition of the battery 401, the rectifier circuit portion 600 to convert electric power received from the antenna 113 from alternating current to direct current, the charging protection circuit portion 101b to protect the internal circuit when electric power received from the antenna 113 is excessively large, and the charging protection circuit control circuit portion 102b (also called the charging comparison circuit) to control whether or not to operate the charging protection circuit portion 101b.

In this specification, a battery refers to a battery which can restore continuous operating time by being charged.

Note that, as a battery, for example, a lithium battery, and more preferably, a battery formed in a sheet shape such as a lithium polymer battery using a gel-like electrolyte, a lithium ion battery, or the like is used. By using the sheet-shape battery, the battery can be reduced in size (thickness). Of course, any battery can be used as long as the battery can be charged, and a battery capable of charging and discharging such as a nickel-metal-hydride battery or a nickel-cadmium battery, or a capacitor having high capacity or the like may be used as well.

When the communication distance is appropriate and the RF tag operates normally, the voltage (V2_BIAS) applied to the gate electrode of the transistor 204 is constant due to the function of the charging mechanism control circuit portion 410, so that the transistor 204 functions as a constant current source.

Further, when the potential of the node p is lower than the threshold voltage of the diode 207, the transistor 203 is turned off and the potential of the drain voltage of the transistor 204 is kept to the potential which is equal to the potential of the −V2 terminal.

The drain electrode of the transistor 204 is connected to the gate electrode of the transistor 202 and the transistor 202 is always off. Therefore, no current flows into the load 201 and the input impedance of the chip itself 120 does not change. Therefore, the RF tag 700 operates normally.

When the communication distance is extremely short and a large amount of electric power is supplied to the RF tag, the potential of the node p becomes higher than the threshold voltage of the diode 207 and current flows into the diode 207, so that the potential of the node p is decreased. In accordance with this, the transistor 203 is turned on.

When the transistor 203 is turned on and current flows into the node q, the potential of the node q is increased. When the potential of the node q becomes higher than the threshold voltage of the transistor 202, the transistor 202 is turned on and current flows into the load 201.

When current flows into the load 201, the impedance of the chip itself 120 is changed.

To change the input impedance of the chip itself 120 means that the impedance matching between the antennas 112 and 113 and the chip itself 120 is deviated. In other words, the reflection coefficient is increased.

In general, electric-power reflection occurs when matching between output impedance on the side of supplying electric power and input impedance on the side of receiving electric power is deviated, and the transmission efficiency of electric power is decreased. That is, in order to efficiently transmit electric power received by the antennas 112 and 113 to the chip itself 120, matching impedance between the antennas 112 and 113 and the chip itself 120 is required.

The above-described property is used in this embodiment, too. When the communication distance is extremely short and a large amount of electric power is supplied to the RF tag, current is supplied to the load 201 to change the input impedance of the chip itself 120, so that the impedance matching between the antennas 112 and 113 and the chip itself 120 is deviated intentionally. Accordingly, a large amount of electric power which may be received by the antennas 112 and 113 is not transmitted to the chip itself 120 so much, and therefore, the RF tag 700 can be operated without deteriorating an internal element of the RF tag or destroying the RF tag itself.

Further, by using this embodiment, even when the communication distance is long and electric power required for driving an internal circuit of an RF tag cannot be obtained only from a received electric wave from a reader/writer, communication with the reader/writer can be performed by using a power source voltage charged in a battery.

Further, in the case where the charging capacity of the battery is large enough, a volatile memory such as a DRAM (Dynamic Random Access Memory) or an SRAM (Static Random Access Memory), for example, can be mounted as a memory unit of the RF tag 700.

Further, the case where two antennas, that is, the antenna 112 and the antenna 113, are used is described in this embodiment. By designing such that the two antennas have different resonance frequencies, the battery can be charged at the time other than the communication time with the reader/writer.

Further, as a deformation example of the input circuit portion according to Embodiment 6 of the present invention, one antenna can be used as both the antenna 112 and the antenna 113.

Since the same antenna can be used for either communication with the reader/writer or for battery charging, the size of the RF tag can be reduced.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 8)

In this embodiment, an example of manufacturing an antenna and a transistor included in an RF tag is described.

Note that the RF tag for communicating data by wireless communication, described in this specification is also a device including a transistor or the like which is an element capable of functioning by using semiconductor characteristics. Therefore, the RF tag may also be referred to as a semiconductor device in this specification.

Figure 19:
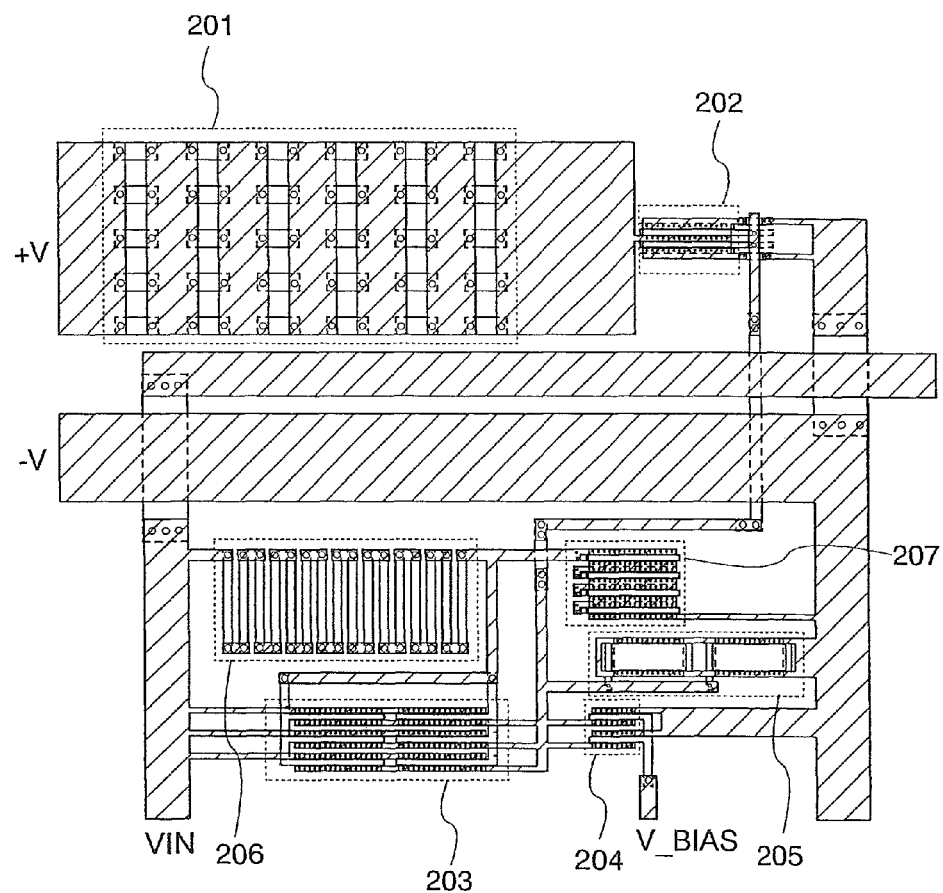
FIG. 19 is a diagram for describing Embodiment 8 of the present invention.

First, a layout diagram of semiconductor elements included in the RF tag of the present invention is shown in FIG. 19. The layout diagram in FIG. 19 corresponds to the protection circuit 101 and the protection circuit control circuit portion 102 in the circuit diagram shown in FIG. 3. FIG. 19 shows, as an example, a layout diagram in which the elements which are the load 201 including a resistor, the transistors 202, 203, and 204, the capacitor 205, the resistor 206, and the diode 207 are connected with a wiring. An example of manufacturing the transistors 202, 203, and 204 shown in FIG. 19 is described below in detail with reference to FIGS. 13A to 13D, 14A and 14B, 15A and 15B, and 16A and 16B, and an example in which an antenna is provided over the transistors is described. Note that as for the transistor described in this embodiment, the case of manufacturing the transistor using a semiconductor film formed over an insulating substrate is described below.

Figure 13A:
FIGS. 13A to 13D are diagrams for describing Embodiment 8 of the present invention.
Figure 13B:
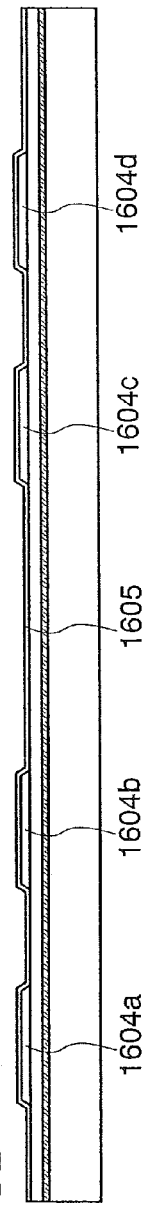

A separation layer 1602 is formed on one surface of a substrate 1601, and subsequently an insulating film 1603 which functions as a base and an amorphous semiconductor film 1604 (e.g., a film containing amorphous silicon) are formed (FIG. 13A). The separation layer 1602, the insulating film 1603, and the amorphous semiconductor film 1604 can be formed consecutively. By forming consecutively, they are not exposed to the air so that impurities can be prevented from being contained therein.

As the substrate 1601, a glass substrate, a quartz substrate, a metal substrate, a stainless steel substrate, a plastic substrate having heat resistance against the treatment temperature of the process, or the like can be used. When such a substrate is used, area and shape thereof are not restricted so much; therefore, by using a rectangular substrate with at least one meter on a side, for example, the productivity can be drastically improved. This merit is greatly advantageous as compared to the case of using a circular silicon substrate. Therefore, even in the case where an integrated circuit portion or an antenna is formed to be larger than that of the case of using a silicon substrate, reduction is cost can be realized.

Note that, in this process, the separation layer 1602 is provided on an entire surface of the substrate 1601; however, after providing the separation layer on the entire surface of the substrate 1601, the separation layer may be selectively etched by photolithography, if necessary. Further, the separation layer 1602 is formed to be in contact with the substrate 1601; however, an insulating film such as a silicon oxide ($SiO_x$) film, a silicon oxynitride ($SiO_xN_y$, x>y) film, a silicon nitride ($SiN_x$) film, or a silicon nitride oxide ($SiN_xO_y$, x>y) film may be formed to be in contact with the substrate 1601, and then the separation layer 1602 may be formed to be in contact with the insulating film.

The separation layer 1602 can be formed of a metal film, a stacked layer of a metal film and a metal oxide film, or the like. As the metal film, a single-layer film or a stacked-layer film of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material mainly containing any of the elements. Such a material can be formed by a sputtering method, any CVD method such as a plasma CVD method, or the like. In order to form the stacked layer of a metal film and a metal oxide film, plasma treatment under an oxygen atmosphere or an $N_2O$ atmosphere or heat treatment under an oxygen atmosphere or an $N_2O$ atmosphere may be performed after the above-described metal film is formed, whereby an oxide or an oxynitride of the metal film can be provided on the metal film. Alternatively, the surface of the metal film may be processed with a strong oxidative solution such as ozone water after the above-described metal film is formed, whereby an oxide or an oxynitride of the metal film can be provided on the metal film.

The insulating film 1603 is formed of a single-layer film or a stacked-layer film containing oxide of silicon or nitride of silicon by a sputtering method, a plasma CVD method, or the like. In the case where the insulating film which functions as a base has a two-layer structure, a silicon nitride oxide film may be formed as the first layer, and a silicon oxynitride film may be formed as the second layer, for example. In the case where the insulating film which functions as a base has a three-layer structure, a silicon oxide film, a silicon nitride oxide film, and a silicon oxynitride film may be formed as the first insulating film, the second insulating film, and the third insulating film, respectively. Alternatively, a silicon oxynitride film, a silicon nitride oxide film, and a silicon oxynitride film may be formed as the first insulating film, the second insulating film, and the third insulating film, respectively. The insulating film which functions as a base functions as a blocking film for preventing entry of an impurity from the substrate 1601.

The semiconductor film 1604 is formed with a thickness of 25 to 200 nm (preferably 30 to 150 nm) by a sputtering method, an LPCVD method, a plasma CVD method, or the like. As the semiconductor film 1604, an amorphous silicon film may be formed, as example.

Next, the amorphous semiconductor film 1604 is crystallized by laser irradiation. Note that the crystallization of the amorphous semiconductor film 1604 may also be conducted by a method combining the laser crystallization with a thermal crystallization method using RTA or an annealing furnace or with a thermal crystallization method using a metal element which promotes the crystallization. After that, the crystallized semiconductor film is etched into a desired shape, whereby semiconductor films 1604a to 1604d are formed. Then, a gate insulating film 1605 is formed so as to cover the semiconductor films 1604a to 1604d (see FIG. 13B).

An example of a manufacturing process of the semiconductor films 1604a to 1604d is briefly described below. First, an amorphous semiconductor film (e.g., an amorphous silicon film) with a thickness of 50 to 60 nm is formed by a plasma CVD method. Then, after a solution containing nickel which is a metal element for promoting crystallization is retained on the amorphous semiconductor film, dehydrogenation treatment (at 500° C. for 1 hour) and thermal crystallization treatment (at 550° C. for 4 hours) are performed, whereby a crystalline semiconductor film is formed. Then, the crystalline semiconductor film is irradiated with laser light from a laser oscillator and a photolithography method is used, whereby the semiconductor films 1604a to 1604d are formed. Note that crystallization of the amorphous semiconductor film may also be conducted only by laser light irradiation without using thermal crystallization which uses a metal element for promoting crystallization.

As the laser oscillator, either a continuous wave laser (a CW laser) or a pulsed laser can be used. As a laser that can be used here, there are gas lasers such as an Ar laser, a Kr laser, and an excimer laser; a laser in which single-crystalline YAG; YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more laser media selected from among Nd, Yb, Cr, Ti, Ho, Er, Tm, and Ta as dopant; a glass laser; a ruby laser; an alexandrite laser; a Ti:sapphire laser; a copper vapor laser; and a metal vapor laser. When irradiation is conducted with the fundamental wave of such a laser or any of the second to fourth harmonics thereof, crystals with a large grain size can be obtained. For example, the second harmonic (532 nm) or the third harmonic (355 nm) of an Nd:YVO$_4$ laser (the fundamental wave of 1064 nm) can be used. At this time, a laser power density of about 0.01 to 100 MW/cm$^2$ (preferably, 0.1 to 10 MW/cm$^2$) is required, and irradiation is conducted with a scanning rate of about 10 to 2000 cm/sec. Note that the laser in which single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more laser media selected from among Nd, Yb, Cr, Ti, Ho, Er, Tm, and Ta as dopant; an Ar-ion laser, or a Ti:sapphire laser can be used as a CW laser, and they can also be used as pulsed laser with a repetition rate of 10 MHz or more by being combined with a Q-switch operation, mode locking, or the like. When a laser beam with a repetition rate of 10 MHz or more is used, it is possible for a semiconductor film to be irradiated with the next pulse after it is melted by the previous laser but before it becomes solidified. Therefore, unlike the case of using a pulsed laser with a low repetition rate, a solid-liquid interface in the semiconductor film can be continuously moved. Thus, crystal grains which have grown continuously in the scanning direction can be obtained.

Next, the gate insulating film 1605 to cover the semiconductor films 1604a to 1604d is formed. The gate insulating film 1605 is formed of a single-layer film or a stacked-layer film containing oxide of silicon or nitride of silicon by a CVD method, a sputtering method, or the like. Specifically, a single-layer film or a stacked-layer film of a silicon oxide film, a silicon oxynitride film, or/and a silicon nitride oxide film.

Further, the gate insulating film 1605 can also be formed by oxidizing or nitriding the surfaces of the amorphous semiconductor films 1604a to 1604d with high-density-plasma treatment. For example, plasma treatment with a mixed gas of a rare gas such as He, Ar, Kr, or Xe, and oxygen, nitrogen oxide (NO$_2$), ammonia, nitrogen, hydrogen, or the like is used. When plasma is excited by the introduction of microwaves, plasma with a low electron temperature and a high electron density can be generated. With oxygen radicals (which may include OH radicals) or nitrogen radicals (which may include NH radicals) which are produced by the high-density plasma, the surfaces of the semiconductor films can be oxidized or nitrided.

By such high-density-plasma treatment, an insulating film with a thickness of 1 to 20 nm, typically 5 to 10 nm, is formed on the semiconductor films Since the reaction in this case is a solid-phase reaction, interface state density between the insulating film and each semiconductor film can be quite low. Since such high-density-plasma treatment directly oxidizes (or nitrides) the semiconductor films (made of crystalline silicon or polycrystalline silicon), the insulating film can be ideally formed to have a uniform thickness. In addition, since even at crystal grain boundaries of crystalline silicon, the oxidation degree is not strong, the insulating film becomes an excellent state. That is, by the solid-phase oxidation of the surfaces of the semiconductor films with high-density-plasma treatment described here, an insulating film with a uniform thickness and low interface state density can be formed without excessive oxidation at the crystal grain boundaries.

As the gate insulating film 1605, only the insulating film formed by high-density-plasma treatment may be used, or a stacked-layer film of the insulating film formed by high-density-plasma treatment and an insulating film of silicon oxide, silicon oxynitride, silicon nitride, or the like stacked by a CVD method using plasma or thermal reaction may be used. In either case, a transistor which includes the insulating film formed by high-density-plasma treatment in a part or the whole of the gate insulating film can have less characteristic variations.

Further, the semiconductor films 1604a to 1604d have a characteristic in that their crystals have grown in the beam scanning direction when they are obtained by crystallization by scanning in one direction along with the irradiation with a CW laser or a pulsed laser at a repetition rate of 10 MHz or more. By arranging a transistor so that its channel length direction (a direction in which carriers flow when a channel formation region is formed) is aligned with the scan direction, and combining with the above-described gate insulating film, a thin film transistor (TFT) with high electron field-effect mobility and few variations in characteristics can be obtained.

Next, a first conductive film and a second conductive film are stacked over the gate insulating film 1605. Here, the first conductive film is formed to a thickness of 20 to 100 nm by a plasma CVD method, a sputtering method, or the like. The second conductive film is formed to a thickness of 100 to 400 nm. Each of the first conductive film and the second conductive film is formed of an element selected from tantalum (Ta), tungsten (W), titanium (Ti), molybdenum (Mo), aluminum (Al), copper (Cu), chromium (Cr), niobium (Nb), or the like, or an alloy material or a compound material containing such an element as a main component. Alternatively, each of the first conductive film and the second conductive may be formed of a semiconductor material typified by polycrystalline silicon doped with an impurity element such as phosphorus. As combination examples of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after forming the first conductive film and the second conductive film, thermal treatment can be applied thereto for the purpose of thermal activation. In addition, in the case where a three-layer structure is employed instead of a two-layer structure, it is preferable to employ a stacked-layer structure of a molybdenum film, an aluminum film, and a molybdenum film.

Next, a resist mask is formed by a photolithography method, and etching treatment for forming gate electrodes and gate wirings is performed, whereby gate electrodes 1607 are formed above the semiconductor films 1604a to 1604d.

Next, a resist mask is formed by a photolithography method, and the semiconductor films 1604a to 1604d are doped with an n-type impurity element at a low concentration by an ion doping method or an ion implantation method. As the n-type impurity element, an element in Group 15 in the Periodic Table of the Elements may be used, and for example, phosphorus (P) or arsenic (As) is used.

Next, an insulating film is formed so as to cover the gate insulating film 1605 and the gate electrodes 1607. The insulating film is formed of a single-layer film or a stacked-layer film containing an inorganic material such as silicon, oxide of silicon, or nitride of silicon, or an organic material such as an organic resin by a plasma CVD method, a sputtering method, or the like. Next, the insulating film is selectively etched by anisotropic etching mainly in the perpendicular direction, so that insulating films 1608 (also referred to as sidewalls) to be in contact with the side surfaces of the gate electrodes 1607 are formed. The insulating films 1608 are used as doping masks for forming LDD (Lightly Doped Drain) regions.

Figure 13C:
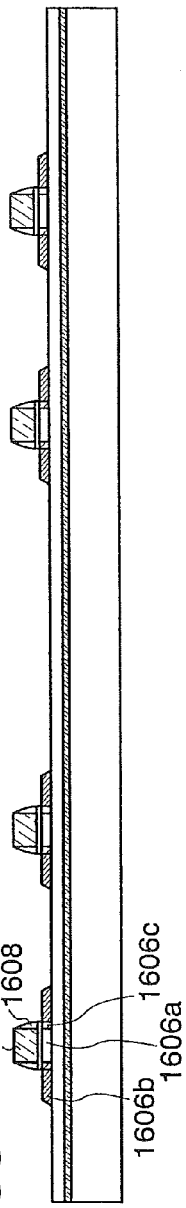

Next, the semiconductor films 1604a to 1604d are doped with an n-type impurity element, using the resist mask formed by a photolithography method, the gate electrodes 1607 and the insulating films 1608 as masks, whereby channel formation regions 1606a, first impurity regions 1606b, and second impurity regions 1606c are formed (FIG. 13C). Each first impurity region 1606b functions as a source or drain region of a thin film transistor, and each second impurity region 1606c functions as an LDD region. The concentration of the impurity element in each second impurity region 1606c is lower than that in each first impurity region 1606b.

Figure 13D:
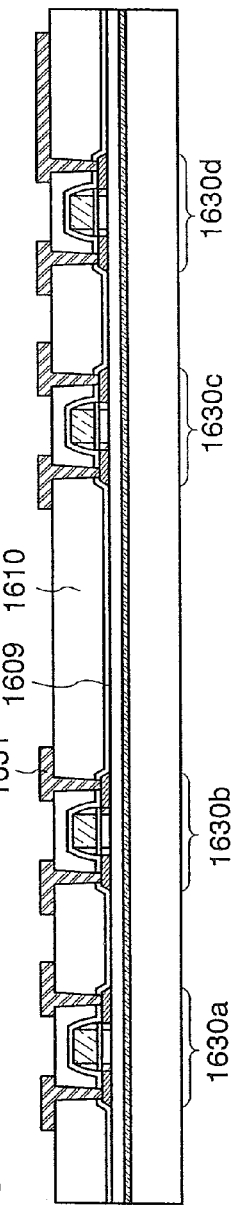

Next, an insulating film formed of a single layer or a staked layer is formed so as to cover the gate electrodes 1607, the insulating films 1608, and the like. Then, conductive films 1631 each of which functions as a source or drain electrode of a thin film transistor is formed over the insulating film. Accordingly, an element layer 1651 including thin film transistors 1630a to 1630d can be obtained (FIG. 13D). Note that the elements including the thin film transistors may be provided over an entire surface of a region 1650 or may be provided over a portion except a part (e.g., a center portion) of the region 1650.

The insulating film is formed either of a single layer or a stacked layer, using an inorganic material such as oxide of silicon or nitride of silicon, an organic material such as polyimide, polyamide, benzocyclobutene, acrylic, or epoxy, a siloxane material, or the like by a CVD method, a sputtering method, an SOG method, a droplet discharge method, a screen printing method, or the like. Here, the example in which the insulating film is formed of two layers is described, and a first insulating film 1609 can be formed of a silicon nitride oxide film and a second insulating film 1610 can be formed of a silicon oxynitride film.

Note that before the insulating films 1609 and 1610 are formed or after at least one of them is formed, thermal treatment is preferably performed for recovery of the crystallinity of the semiconductor films 1604a to 1604d, activation of the impurity element which has been added into the semiconductor films, or hydrogenation of the semiconductor films. As the thermal treatment, thermal annealing, laser annealing, RTA, or the like is preferably employed.

The conductive films 1631 are formed as follows: the insulating films 1609 and 1610 are etched by a photolithography method to form contact holes to expose the first impurity regions 1606b, a conductive film is formed to fill the contact holes, and the conductive film is selectively etched. Note that, before the conductive film is formed, silicide may be formed on each surface of the semiconductor films 1604a to 1604d exposed in the contact holes.

The conductive films 1631 are formed either of a single layer or a stacked layer of an element selected from among aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing such an element as a main component. An alloy material containing aluminum as a main component corresponds to, for example, a material which contains aluminum as a main component and also contains nickel, or a material which contains aluminum as a main component and also contains nickel and one or both of carbon and silicon. The conductive films 1631 are preferably formed to employ a stacked-layer structure of a barrier film, an aluminum-silicon (Al—Si) film, and a barrier film or a stacked-layer structure of a barrier film, an aluminum-silicon (Al—Si) film, a titanium nitride (TiN) film, and a barrier film. Note that a "barrier film" corresponds to a thin film made of titanium, titanium nitride, molybdenum, or molybdenum nitride. Aluminum and aluminum silicon, which have high resistance values and are inexpensive, are the most suitable materials for forming the conductive films 1631. When barrier layers are provided in the top layer and the bottom layer, generation of hillocks of aluminum or aluminum silicon can be prevented. In addition, when a barrier film made of titanium which is an element having a high reducing property is formed, even when a thin natural oxide film is formed on the crystalline semiconductor film, the natural oxide film can be reduced, and a favorable contact between each conductive film 1631 and the crystalline semiconductor film can be obtained.

Figure 14A:
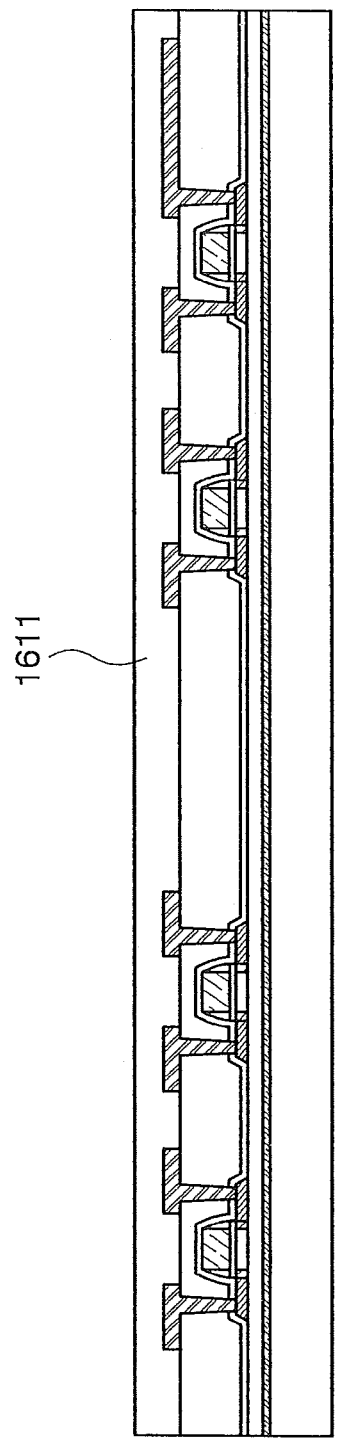
FIGS. 14A and 14B are diagrams for describing Embodiment 8 of the present invention.

Next, an insulating film 1611 is formed so as to cover the conductive films 1631 (FIG. 14A). The insulating film 1611 is formed of a single layer or a stacked layer of an inorganic material or an organic material by a CVD method, a sputtering method, a SOG method, a droplet discharge method, a screen printing method, or the like. It is preferable that the thickness of the insulating film 1611 is 0.75 μm to 3 μm.

Figure 14B:
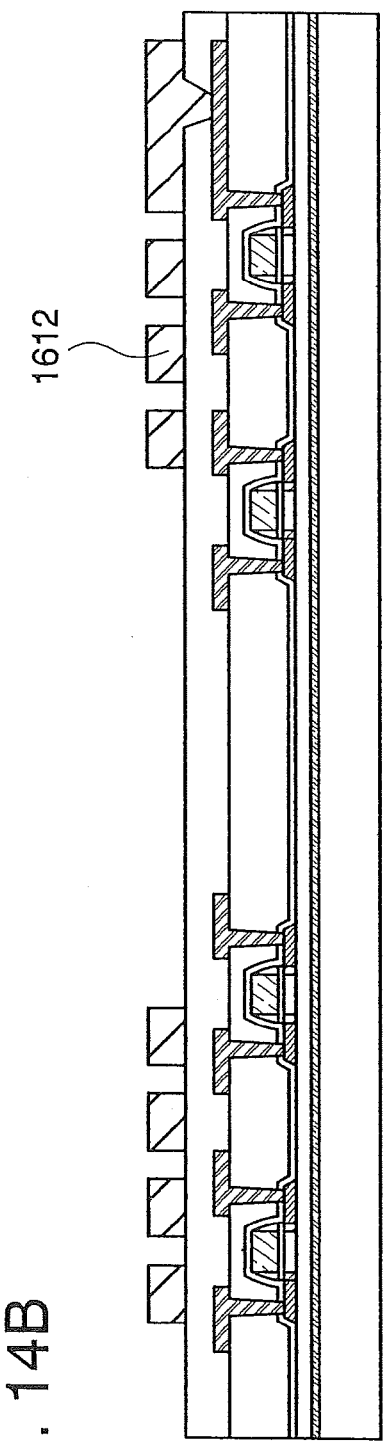

Next, a conductive film 1612 which functions as an antenna is selectively formed on the surface of the insulating film 1611 (FIG. 14B).

The conductive film 1612 is formed as follows: the insulating film 1611 is etched by a photolithography method to form contact holes to expose the conductive films 1631, a conductive film is formed to fill the contact holes, and the conductive film is selectively etched.

The conductive film 1612 may be formed of a conductive material by a CVD method, a sputtering method, a printing method such as a screen printing method or a gravure printing method, a plating method, or the like. The conductive material is an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an element as its main component, and a single-layer structure or a stacked-layer structure is employed.

For example, in the case of using a screen printing method to form the conductive film 1612 functioning as an antenna, the conductive film 1612 can be provided by selective printing of a conductive paste in which conductive particles having a grain size of several nm to several tens of μm are dissolved or dispersed in an organic resin. As the conductive particles, metal particles of one or more of silver (Ag), gold (Au), copper (Cu), nickel (Ni), platinum (Pt), palladium (Pd), tantalum (Ta), molybdenum (Mo), titanium (Ti), and the like, fine particles of silver halide, or dispersive nanoparticles can be used. By forming the conductive film 1612 with the screen printing method, the process can be simplified and cost reduction can be realized.

Figure 15A:
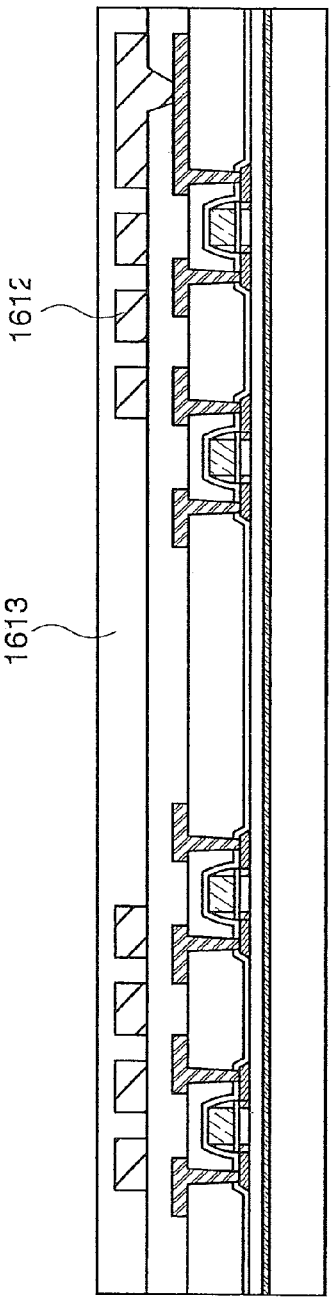
FIGS. 15A and 15B are diagrams for describing Embodiment 8 of the present invention.

Next, an insulating film 1613 is formed so as to cover the conductive film 1612 functioning as an antenna (FIG. 15A).

The insulating film 1613 is formed either of a single layer or a stacked layer, using an inorganic material such as oxide of silicon or nitride of silicon (e.g., a silicon oxide film, a silicon oxynitride film, a silicon nitride film, or a silicon nitride oxide film), an organic material such as polyimide, polyamide, benzocyclobutene, acrylic, or epoxy, a siloxane material, or the like by a CVD method, a sputtering method, an SOG method, a droplet discharge method, a screen printing method, or the like.

Next, an element formation layer including the thin film transistors 1630a to 1630d and the conductive film 1612 functioning as an antenna is separated from the substrate 1601.

Figure 15B:
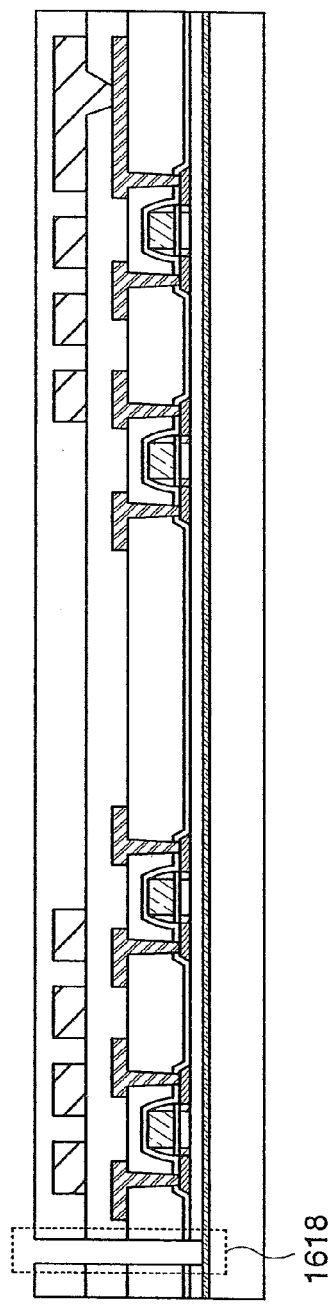

First, an opening portion 1618 is formed by laser light irradiation (FIG. 15B). Subsequently, one surface of the element formation layer (here, the surface of the insulating film 1613) is attached to a first sheet member 1620, and then the element formation layer is separated from the substrate 1601 by physical force (FIG. 16A). As the first sheet member 1620, a hot melt film or the like can be used. Alternatively, in the case where the first sheet member 1620 is to be separated later, a heat separation tape which weakens adhesibility when heat is applied thereto can be used.

Note that by performing the separation of the element formation layer while wetting the surface at which the separation is performed, with an aqueous solution such as water or ozone water, the elements such as the thin film transistors 1630a to 1630d can be prevented from being destroyed by static electricity or the like. Further, by reusing the substrate 1601 after the element formation layer is separated, cost reduction can be realized.

Next, a second sheet member 1621 is provided for the other surface of the element formation layer (the surface exposed by the separation from the substrate 1601) (FIG. 16B). As the second sheet member 1621, a hot melt film or the like is used and can be attached to the other surface of the element formation layer by at least one of heat treatment and pressure treatment. Further, in the case where a heat separation tape is used as the first sheet member 1620, the first sheet member 1620 can be separated using the heat applied for attaching the second sheet member 1621.

Next, by selectively cutting the element formation layer provided with the second sheet member 1621 by dicing, scribing, laser cutting, or the like, a plurality of RF tags can be obtained. By using a flexible substrate made of plastic or the like as the second sheet member 1621, flexible RF tags can be manufactured.

Note that although the case where the flexible RF tag is manufactured by separation from the substrate 1601 after the elements including the thin film transistors and the antenna are formed over the substrate 1601 is described in this embodiment, the present invention is not limited thereto. For example, the separation layer 1602 is not provided on the substrate 1601, and the steps shown in FIGS. 13A, 13B, 14A, 14B, and 15A are applied, whereby an RF tag in which the elements including the thin film transistors and the antenna are formed over the substrate 1601 can be manufactured.

Note that although the example where the antenna and the transistors are formed over the same substrate is described in this embodiment, the present invention is not limited thereto. For example, after transistors are formed, an antenna which is separately formed may be electrically connected to an integrated circuit. In this case, the electrical connection between the antenna and the integrated circuit can be performed by pressure bonding using an anisotropic conductive film (ACF), an anisotropic conductive paste (ACP), or the like. Further, the connection can also be performed by using a conductive adhesive such as a silver paste, a copper paste, or a carbon paste, solder bonding, or the like.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 9)

In this embodiment, an example of manufacturing transistors included in an RF tag by using a single crystalline silicon substrate is described with reference to FIGS. 17A and 17B, and 18.

First, a process for manufacturing transistors is described with reference to FIG. 17A. A silicon substrate 1901 formed of single crystalline silicon is prepared. Then, a p-type well 1902 is selectively formed in an element formation region in a main surface (an element formation surface or a circuit formation surface) of the silicon substrate provided with the n-type conductivity. Further, the silicon substrate can be made thinner by, for example, polishing the back surface thereof. By making the silicon substrate thin in advance, a lightweight and thin RF tag can be manufactured.

Next, a field oxide film 1903 to be an element isolation region for partitioning a first element formation region and a second element formation region is formed. The field oxide film 1903 is a thick thermal oxide film and may be formed by a known LOCOS method. Note that the method for partitioning the element formation regions is not limited to a LOCOS method. For example, by using a trench isolation method, the element isolation region may be formed to have a trench structure, or a LOCOS structure and a trench structure may be combined.

Next, a gate insulating film 1904 is formed by, for example, thermally oxidizing the surface of the silicon substrate. The gate insulating film 1904 may also be formed by a CVD method, and a silicon oxynitride film, a silicon oxide film, a silicon nitride film, or a stacked-layer film thereof may also be used.

Next, a stacked-layer film of a polysilicon layer 1905a and a silicide layer 1905b is formed over the entire surface, and lithography and dry etching are performed thereto, whereby gate electrodes 1905 having a polycide structure are formed over the gate insulating film. The polysilicon layer 1905a may be doped with phosphorus (P) at a concentration of about $10^{21}/cm^3$ in advance in order to reduce resistance, or high concentration n-type impurities may be diffused after the polysilicon layer is formed. Further, the silicide layer 1905b can be formed of a material such as molybdenum silicide, tungsten silicide, tantalum silicide, or titanium silicide, using a known method.

Note that, sidewalls may be formed on the sides of the gate electrodes. For example, an insulating material layer formed of silicon oxide may be deposited over the entire surface by a CVD method, and the insulating material layer may be etched back to form the sidewalls. At the time of etch back, the gate insulating film may be selectively removed in a self-aligned manner.

Next, the exposed silicon substrate is subjected to ion implantation, to form source and drain regions. The element formation region for forming a p-channel TFT is covered with a resist material, and arsenic (As) or phosphorus (P) which is an n-type impurity is implanted into the silicon substrate to form a source region 1913 and a drain region 1914. Further, the element formation region for forming an n-channel TFT is covered with a resist material, and boron (B) which is a p-type impurity is implanted into the silicon substrate to form a source region 1915 and a drain region 1916.

Subsequently, activation treatment is performed in order to activate the ion implanted impurities and to repair crystal defects in the silicon substrate generated by the ion-implantation.

After the activation, an interlayer insulating film, a metal wiring which functions as a source or drain electrode, and the like are formed. An interlayer insulating film 1917 is formed of a silicon oxide film, a silicon oxynitride film, or the like by a plasma CVD method or a low pressure CVD method. Moreover, an interlayer insulating film formed of phosphosilicate glass (PSG), borosilicate glass (BSG), or borophosphosilicate glass (BPSG) may be formed thereover.

Metal electrodes 1919, 1921, 1920, and 1922 are formed after forming contact holes reaching the source and drain regions of the respective TFTs in the interlayer insulating film 1917, and may be formed of aluminum which is commonly used as a low resistance material. Further, the metal electrodes may employ a stacked-layer structure of aluminum and titanium.

Note that the contact holes may be formed by an electron beam direct writing technique. In the electron beam direct writing technique, a positive-type resist for electron beam lithography is formed on the entire surface of the interlayer insulating film 1917, and a portion irradiated with an electron beam is dissolved using a developing solution. Then, holes are opened in the resist at positions where the contact holes are to be formed, and dry etching is performed using the resist as a mask, so that predetermined positions of the interlayer insulating film 1917 are etched to form the contact holes. In this manner, a p-channel transistor 1951 and an n-channel transistor 1952 can be manufactured using the single crystalline substrate (FIG. 17A).

Next, an interlayer film 1924 is formed as shown in FIG. 17B. Then, the interlayer film 1924 is etched to form a contact hole so that the metal electrode 1922 is partially exposed. The interlayer film 1924 is not limited to a resin but may be another film such as a CVD oxide film; however, it is preferable that the interlayer film 1924 be a resin for flatness. Further, a photosensitive resin may also be used so that the contact holes can be formed without using etching. Next, over the interlayer film 1924, a wiring 1925 which is in contact with the metal electrode 1922 through the contact hole is formed.

Next, a conductive film 1926 which functions as an antenna is formed to be in contact with the wiring 1925. The conductive film 1926 can be formed of a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fr), cobalt (Co), zinc (Zn), tin (Sn), or nickel (Ni). The conductive film 1926 can also be formed of a film of an alloy containing the above-described metal as its main component or a film of a compound containing the above-described metal as well as a film of the above-described metal. The conductive film 1926 may employ a single-layer structure or a stacked-layer structure of the above-described film.

The conductive film 1926 can be formed by a CVD method, a sputtering method, a printing method such as a screen printing method or a gravure printing method, a droplet discharge method, a dispenser method, a plating method, a photolithography method, a vapor-deposition method, or the like.

Note that although the example where the antenna is formed over the transistors is described in this embodiment, the present invention is not limited to this structure. For example, after transistors are formed, an antenna which is separately formed may be electrically connected to an integrated circuit. In this case, the electrical connection between the antenna and the integrated circuit can be performed by pressure bonding using an anisotropic conductive film (ACF), an anisotropic conductive paste (ACP), or the like. Further, the connection can also be performed by using a conductive adhesive such as a silver paste, a copper paste, or a carbon paste, solder bonding, or the like.

Figure 18:
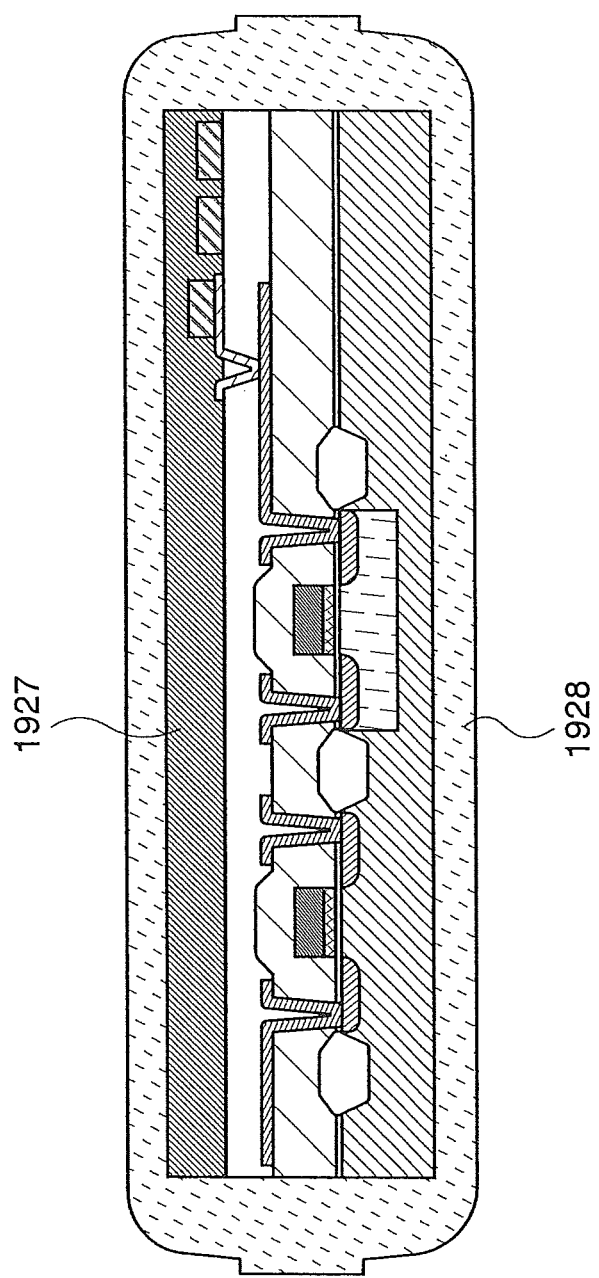
FIG. 18 is a diagram for describing Embodiment 9 of the present invention.

Next, as shown in FIG. 18, a protection film 1927 is formed to cover the conductive film 1926 which functions as an antenna. The protection film 1927 is formed of a silicon nitride film, a silicon oxide film, or a silicon nitride oxide film. Alternatively, an organic resin film may be formed instead of the above-described silicon nitride film or the like, or an organic resin film may be stacked over the protection film. As the organic resin material, polyimide, polyamide, acrylic, benzocyclobutene (BCB), or the like can be used. Using an organic resin film is advantageous in that, for example, the method for forming the film is simple, parasitic capacitance can be reduced because of low dielectric constant, and it is suitable for planarization. It is needless to say, an organic resin film other than the ones described above may also be used.

Then, as shown in FIG. 18, an RF tag can be completed by being covered with a film 1928. A protection film may be formed on the surface of the film 1928 in order to prevent entry of moisture, oxygen, or the like. The protection film can be formed of oxide containing silicon or nitride containing silicon. In addition, a pattern which is to be a booster antenna of the RF tag may be formed on the film.

By using the RF tag thus formed using a single crystalline substrate, a lightweight and smaller product can be provided.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

(Embodiment 10)

Use application of the RF tag for communicating data by wireless communication, of the present invention and a communication system suing the RF tag is described in this embodiment. For example, the RF tag of the present invention can be provided for bills; coins; securities; bearer bonds; certificates (including driver's licenses and resident's cards); packing containers (including wrapping paper and bottles); DVD (Digital Versatile Disc) software; and CDs (compact discs). Further, the RF tag of the present invention can also be provided for recording media such as video tapes; vehicles such as cars, motorcycles, and bicycles; personal belongings such as bags and glasses; foods; clothes; commodities; electronic appliances; and the like. The electronic appliances include a liquid crystal display device, an EL (electroluminescence) display device, a television device (it is also called simply a television or a television receiver), a mobile phone, and the like.

The RF tag of the present invention can be fixed to an object by being attached to a surface of the object or embedded in the object. For example, the RF tag may be embedded in paper of a book, or an organic resin of a package formed of the organic resin. The RF tag being provided for bills, coins, securities, bearer bonds, certificates, and the like can prevent forgery of them. Further, the RF tag being provided for wrapping containers, recording media, personal belongings, foods, clothes, commodities, electronic appliances, and the like can improve the efficiency of an inspection system, a system of a rental shop, and the like. Further, the RF tag being provided for vehicles can prevent forgery or theft of the vehicles. Further, the RF tag being implanted into creatures such as animals can identify each creature easily. For example, by implementing a wireless tag into creatures such as domestic animals, the year of birth, sex, breed, and the like thereof can be easily identified.

As described above, the RF tag of the present invention can be provided for any object (including creatures).

Figure 12A:
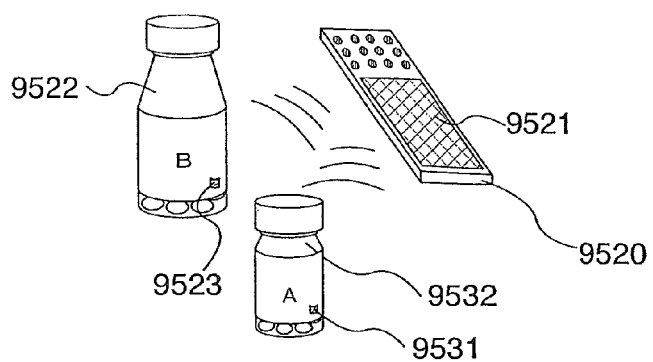
FIGS. 12A to 12C are diagrams for describing Embodiment 10 of the present invention.

Subsequently, one mode of a system using the RF tag is described with reference to FIG. 12A. A terminal 9520 including a display portion 9521 is provided with an antenna and a reader/writer connected to the antenna. An object A 9532 is provided with an RF tag 9531 of the present invention and an object B 9522 is provided with an RF tag 9523 of the present invention. In FIG. 12A, internal medicine is shown as each example of the objects A and B. When the antenna of the terminal 9520 is held close to the RF tag 9531 included in the object A 9532, the display portion 9521 displays information on the object A 9532 such as a raw material, a place of origin, a test result in each production process, a record of distribution, and description of the article. When the antenna of the terminal 9520 is held close to the RF tag 9523 included in the object B 9522, the display portion 9521 displays information on the object B 9522 such as a raw material, a place of origin, a test result in each production process, a record of distribution, and description of the object.

Figure 12B:
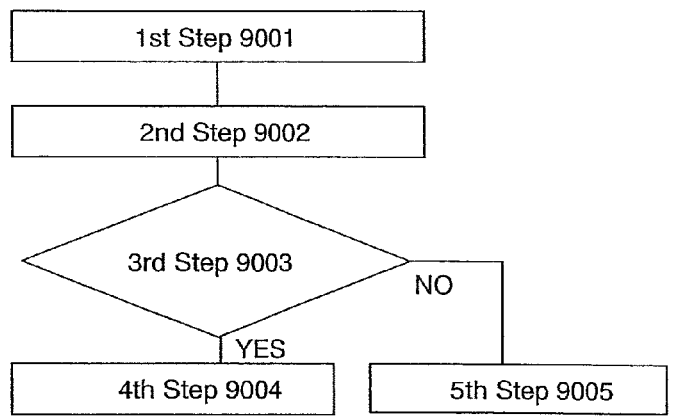

An example of a business model utilizing the system shown in FIG. 12A is described with reference to a flow chart shown in FIG. 12B. Information on allergy is input to the terminal 9520 (a first step 9001). The information on allergy is information on medical products, their components, or the like that may cause allergic reactions to certain people. As described above, information on the internal medicine A, which is the object A 9532, is obtained by the antenna provided for the terminal 9520 (a second step 9002). The information on the internal medicine A includes information on the components or the like of the internal medicine A. The information on allergy is compared with the obtained information on components or the like of the internal medicine A, thereby determining whether or not to coincide with each other (a third step 9003). If they coincide with each other, a user of the terminal 9520 is alerted that certain people may have allergic reactions to the internal medicine A (a fourth step 9004). If they do not coincide with each other, the user of the terminal 9520 is informed that certain people are at low risk of having allergic reactions to the internal medicine A (the fact that the internal medicine A is safe) (a fifth step 9005). In each of the fourth step 4004 and the fifth step 4005, in order to inform the user of the terminal 9520 of the information, the information may be displayed on the display portion 9521 of the terminal 9520 or an alarm of the terminal 9520 or the like may be sounded.

Figure 12C:
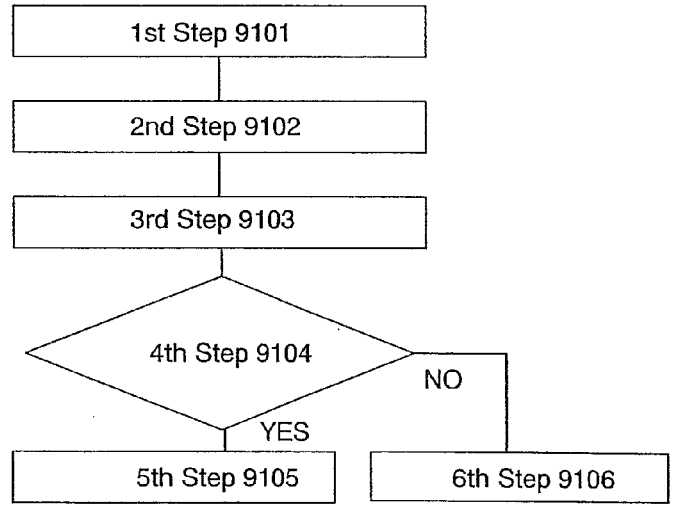

Further, an example of another business model thereof is shown in FIG. 12C. Information on a combination of internal medicines which are dangerous when taken at the same time or a combination of components of internal medicines which are dangerous when taken at the same time (hereinafter referred to as combination information) is input to the terminal 9520 (a first step 9101). As described above, information on the internal medicine A, which is the object A 9532, is obtained by the antenna provided for the terminal 9520 (a second step 9102). The information on the internal medicine A includes information on components and the like of the internal medicine A. Next, as described above, information on the internal medicine B, which is the object B 9522, is obtained by the antenna provided for the terminal 9520 (a third step 9103). The information on the internal medicine B includes information on components and the like of the internal medicine B. In this way, information on a plurality of internal medicines is obtained. The combination information is compared with the obtained information on the plurality of internal medicines, thereby determining whether or not to coincide with each other, that is, whether a combination of components of internal medicines which are dangerous when taken at the same time is contained or not (a fourth step 9104). If they coincide with each other, the user of the terminal 9520 is alerted (a fifth step 9105). If they do not coincide with each other, the user of the terminal 9520 is informed of the safety (a sixth step 9106). In each of the fifth step 9105 and the sixth step 9106, in order to inform the user of the terminal 9520 of the information, the information may be displayed on the display portion 9521 of the terminal 9520 or an alarm of the terminal or the like may be sounded.

This embodiment can be combined with any technical component of the embodiment mode and the other embodiments. That is, by using the present invention, impedance matching between an antenna and a chip itself included in an RF tag can be deviated intentionally. Therefore, a problem caused by a large amount of electric power received by an RF tag in such a case where the communication distance between the RF tag and a reader/writer is extremely short can be prevented, so that improvement in reliability of an RF tag can be achieved. That is, without deteriorating an internal element of an RF tag or destroying an RF tag itself, the RF tag can be operated normally.

This application is based on Japanese Patent Application Serial No. 2006283935 filed in Japan Patent Office on Oct. 18, 2006, the entire contents of which are hereby incorporated by reference.

What is claimed is:

1. A semiconductor device comprising:
    a circuit electrically connected to a first node;
    a first transistor including a source, a drain, and a gate, wherein one of the source and the drain is directly connected to the first node, and wherein the gate is electrically connected to a second node;
    a resistor including a first terminal and a second terminal, wherein the first terminal is directly connected to the first node, and wherein the second terminal is electrically connected to the second node; and
    a first diode between the second node and a third node,
    wherein an impedance of the circuit is capable of being controlled in accordance with a potential of the other of the source and the drain.

2. The semiconductor device according to claim 1, further comprising:
    a second transistor; and
    a constant power source circuit configured to supply a reference voltage,
    wherein the reference voltage is supplied to a gate of the second transistor,
    wherein one of a source and a drain of the second transistor is electrically connected to the other of the source and the drain of the first transistor, and
    wherein the one of the source and the drain of the second transistor is electrically connected to the circuit.

3. The semiconductor device according to claim 1, further comprising:
    a rectifier circuit;
    wherein an input portion of the rectifier circuit is electrically connected to the circuit, and
    wherein an output portion of the rectifier circuit is electrically connected to the first node.

4. The semiconductor device according to claim 1,
    wherein the circuit comprises a second transistor, and
    wherein a gate of the second transistor is electrically connected to the other of the source and the drain of the first transistor.

5. The semiconductor device according to claim 1, further comprising:
    a second diode,
    wherein the first diode and the second diode are connected in series between the second node and the third node.

6. The semiconductor device according to claim 1,
    wherein the circuit comprises a load,
    wherein an impedance of the load is capable of being controlled in accordance with the potential of the other of the source and the drain.

7. The semiconductor device according to claim 1, further comprising:
    an antenna electrically connected to the circuit.

8. A semiconductor device comprising:
    a circuit electrically connected to a first node;
    a capacitor electrically connected to the circuit;
    a first transistor including a source, a drain, and a gate, wherein one of the source and the drain is directly connected to the first node, and wherein the gate is electrically connected to a second node;
    a resistor including a first terminal and a second terminal, wherein the first terminal is directly connected to the first node, and wherein the second terminal is electrically connected to the second node; and
    a first diode between the second node and a third node,
    wherein an impedance of the circuit is capable of being controlled in accordance with a potential of the other of the source and the drain.

9. The semiconductor device according to claim 8, further comprising:
    a second transistor; and
    a constant power source circuit configured to supply a reference voltage,
    wherein the reference voltage is supplied to a gate of the second transistor,
    wherein one of a source and a drain of the second transistor is electrically connected to the other of the source and the drain of the first transistor, and
    wherein the one of the source and the drain of the second transistor is electrically connected to the circuit.

10. The semiconductor device according to claim 8, further comprising:
    a rectifier circuit;
    wherein an input portion of the rectifier circuit is electrically connected to the circuit, and
    wherein an output portion of the rectifier circuit is electrically connected to the first node.

11. The semiconductor device according to claim 8,
    wherein the circuit comprises a second transistor, and
    wherein a gate of the second transistor is electrically connected to the other of the source and the drain of the first transistor.

12. The semiconductor device according to claim 8, further comprising:
    a second diode,
    wherein the first diode and the second diode are connected in series between the second node and the third node.

13. The semiconductor device according to claim 8,
    wherein the circuit comprises a load,
    wherein an impedance of the load is capable of being controlled in accordance with the potential of the other of the source and the drain.

14. The semiconductor device according to claim 8, further comprising:
    an antenna electrically connected to the circuit through the capacitor.

15. The semiconductor device according to claim 8, wherein the circuit is electrically connected to the first node through the capacitor.

* * * * *